US006377865B1

(12) United States Patent
Edelsbrunner et al.

(10) Patent No.: US 6,377,865 B1
(45) Date of Patent: Apr. 23, 2002

(54) METHODS OF GENERATING THREE-DIMENSIONAL DIGITAL MODELS OF OBJECTS BY WRAPPING POINT CLOUD DATA POINTS

(75) Inventors: Herbert Edelsbrunner; Ping Fu, both of Chapel Hill, NC (US)

(73) Assignee: Raindrop Geomagic, Inc., Research Triangle Park, NC (US)

( * ) Notice: Subject to any disclaimer, the term of this patent is extended or adjusted under 35 U.S.C. 154(b) by 0 days.

(21) Appl. No.: 09/248,587

(22) Filed: Feb. 11, 1999

Related U.S. Application Data

(60) Provisional application No. 60/074,415, filed on Feb. 11, 1998.

(51) Int. Cl.[7] .................................. G06F 19/00

(52) U.S. Cl. ........................... 700/98; 703/2; 345/419

(58) Field of Search ........................ 700/98, 97, 117, 700/118, 119, 120, 182; 345/419, 420; 703/2

(56) References Cited

U.S. PATENT DOCUMENTS

| 4,719,585 A | * | 1/1988 | Cline et al. | 345/424 |
|---|---|---|---|---|
| 5,214,752 A | | 5/1993 | Meshkat et al. | 395/123 |
| 5,278,948 A | | 1/1994 | Luken, Jr. | 395/123 |
| 5,357,599 A | | 10/1994 | Luken | 395/134 |
| 5,440,674 A | | 8/1995 | Park | 395/123 |
| 5,506,785 A | | 4/1996 | Blank et al. | 364/468 |
| 5,537,519 A | | 7/1996 | Vossler et al. | 398/120 |
| 5,552,992 A | | 9/1996 | Hunter | 364/468.25 |
| 5,555,356 A | | 9/1996 | Scheibl | 395/134 |
| 5,600,060 A | * | 2/1997 | Grant | 73/147 |
| 5,617,322 A | * | 4/1997 | Yokota | 700/98 |
| 5,668,894 A | | 9/1997 | Hamano et al. | 382/242 |
| 5,760,783 A | | 6/1998 | Migdal et al. | 345/473 |
| 5,768,156 A | | 6/1998 | Tautges et al. | 364/578 |
| 5,850,229 A | * | 12/1998 | Edelsbrunner et al. | 345/473 |
| 5,870,220 A | | 2/1999 | Migdal et al. | 359/216 |
| 5,886,702 A | * | 3/1999 | Migdal et al. | 345/423 |

(List continued on next page.)

OTHER PUBLICATIONS

"Computing Dirichlet tessallations,"A Bowyer; The Computer Journal, vol. 24, No. 2, pp. 162–166, 1981: Heyden & Son Ltd. 1981.

"Optimal Surface Reconstuction From Planar Contours," Fuchs, et al.; Copyright 1977, Association for Computing Machinery, Inc., Communications, vol. 20, pp. 693–702; Oct. 1977, ACM, Box 12105, Church Street Station, New York, NY 11249.

"Geometric Structures for Three–Dimensional Shape Representation," Boissonnat; ACM Transactions on Graphics, vol. 3, No. 4, pp. 267–286, Oct. 1984.

"Shape Reconstruction From Planar Cross Sections," Boissonnat; Computer Vision, Graphics and Image Processing 44; pp. 1–29; 1988.

"Construction of Three–Dimensional Delaunay Triangulations Using Local Transformations," Joe; Computer Aided Geometric Design 8,;1991; pp. 123–142; Elsevier Science Publishers B.V. (North–Holland).

(List continued on next page.)

*Primary Examiner*—William Grant
*Assistant Examiner*—Zoila Cabrera
(74) *Attorney, Agent, or Firm*—Myers Bigel Sibley & & Sajovec

(57) ABSTRACT

A method of automatic conversion of a physical object into a three-dimensional digital model. The method acquires a set of measured data points on the surface of a physical model. From the measured data points, the method reconstructs a digital model of the physical object using a Delaunay complex of the points, a flow strcuture of the simplicies in the Delaunay complex and retracting the Delaunay complex into a digital model of the physical object using the flow structure. The method then outputs the digital model of the physical object.

30 Claims, 19 Drawing Sheets

U.S. PATENT DOCUMENTS

| | | | |
|---|---|---|---|
| 5,903,458 A | 5/1999 | Stewart et al. | 364/468.04 |
| 5,923,573 A | 7/1999 | Hatanaka | 364/578 |
| 5,929,860 A | 7/1999 | Hoppe | 345/419 |
| 5,936,869 A * | 8/1999 | Sakaguchi et al. | 703/1 |
| 5,945,996 A | 8/1999 | Migdal et al. | 345/420 |
| 5,963,209 A | 10/1999 | Hoppe | 345/419 |
| 5,966,133 A | 10/1999 | Hoppe | 345/420 |
| 5,966,140 A | 10/1999 | Popovic et al. | 345/441 |
| 5,966,141 A | 10/1999 | Ito et al. | 345/473 |
| 5,991,437 A | 11/1999 | Migdal et al. | 382/154 |
| 5,995,650 A | 11/1999 | Migdal et al. | 345/154 |
| 6,044,170 A | 3/2000 | Migdal et al. | 382/154 |
| 6,046,744 A | 4/2000 | Hoppe | 345/419 |
| 6,064,771 A | 5/2000 | Migdal et al. | 382/232 |
| 6,100,893 A * | 8/2000 | Ensz et al. | 345/420 |
| 6,108,006 A * | 8/2000 | Hoppe | 345/423 |
| 6,133,921 A * | 10/2000 | Turkiyyah et al. | 345/420 |
| 6,176,427 B1 * | 1/2001 | Antognini et al. | 235/454 |
| 6,205,243 B1 | 3/2001 | Migdal et al. | 382/154 |
| 6,208,347 B1 * | 3/2001 | Migdal et al. | 345/419 |
| 6,266,062 B1 * | 7/2001 | Rivara | 345/419 |
| 6,278,457 B1 * | 8/2001 | Bernardini et al. | 345/420 |

OTHER PUBLICATIONS

"Surface Reconstruction From Unorganized Points," Hoppe et al.; Computer Graphics 26; Jul. 1992; pp. 71–78.

"Surfaces From Contours," Meyers et al.; ACM Transactions on Graphic;, vol. 11; No. 3; Jul. 1992; pp. 228–258.

"Closed Object Boundaries From Scattered Points," Remco Coenraad Veltkamp; Proefschrift Rotterdam,;Netherlands; IBSBN 90–9005424–3; 1991; pp. 1–149.

"Mesh Optimization,"Hoppe et al.; Computer Graphics Proceedings, Annual Conference Series, 1993; pp. 19–26.

"Incremental Topological Flipping Works For Regular Triangulations," Eldelsbrunner et al.; Algorithmica, 1996; Springer–Verlag New York Inc.; pp. 223–241.

"Three–Dimensional Alpha Shapes," Edlesbrunner et al.; ACM Transactions on Graphics; vol. 13; No. 1; Jan. 1994; pp. 43–72.

"Piecewise Smooth Surface Reconstruction," Hoppe et al.;Computer Graphics Proceedings, Annual Conference Series 1994; pp. 295–302.

"Smooth Spline Surfaces Over Irregular Meshes," Loop; Computer Graphics Proceedings, Annual Conference Series 1994,; pp. 303–310.

"C–Surface Splines," Peters; Society for Industrial and Applied Mathematics; 1995,;vol. 32; No. 2; pp. 645–666.

"Modeling With Cubic A–Patches," Bajaj et al.; ACM Transactions on Graphics, vol. 14, No. 2, Apr. 1995; pp. 103–133.

"Automatic Reconstruction Of Surfaces And Scalar Fields From 3D Scans," Bajaj et al.; ACM–0–89791–701–4/95/ 008; Computer Graphics Proceedings, Annual Conference Series 1995; pp. 109–118.

"Piecewise–Linear Interpolation Between Polygonal Slices," Barequet et al.; Computer Vision and Image Understanding, vol. 63, No. 2, Mar. 1996; pp. 251–272.

"A Volumetric Method For Building Complex Models From Range Images," Curless et al.; Computer Graphics Processdings, Annual Conference Series, Aug. 1996; pp. 303–312.

"Automatic Reconstruction Of B–Spline Surfaces Of Arbitrary Topological Type," Eck et al.; Computer Graphics Proceedings, Annual Conference Series, Aug., 1996; pp. 325–334.

"Fitting Smooth Surfaces To Dense Polygon Meshes," Krishnamurthy et al.; Computer Graphics Proceedings, Annual Conference Series, Aug. 1996; pp. 313–324.

Clarkson et al., "Four Results on Randomized Incremental Constructions," Lecture Notes in Computer Science, $9^{th}$ Symposium on Theoretical Aspects of Computer Science, Cachan, France, Feb. 1992 Proceedings, pp. 463–474.

Dey et al., "Topology Preserving Edge Contraction," Publications De L'Institut Mathematique, vol. 66, No. 80, 1999, pp. 23–45.

Eck et al., "Automatic Reconstruction of B–Spline Surfaces of Arbitrary Topological Type," Computer Graphics Proceedings, Annual Conference Series, SIGGRAPH 96, New Orleans, LA, Aug. 4–9, 1996, pp. 325–334.

Edelsbrunner, et al., "Simulation of Simplicity: A Technique to Cope with Degenerate Cases in Geometric Algorithms," ACM Transactions on Graphics, vol. 9, No. 1, Jan. 1990, pp. 66–104.

Edelsbrunner, H., "An Acyclicity Theorem for Cell Complexes in $d$ Dimension,"Combinatorica, vol. 10, No. 3, 1990, pp. 251–260.

Garland et al., "Surface Simplification Using Quadric Error Metrics," Computer Graphics Proceedings (SIGGRAPH), 1997, pp.209–216.

Hagen et al, "Variational Design with Boundary Conditions and Parameter Optimized Surface Fitting," Geometric Modeling: Theory and Practice, Springer–Verlag, 1997, pp. 3–13.

Hsu et al., "Minimizing the Squared Mean Curvature Integral for Surfaces in Space Forms," Experimental Math, vol. 1, 1992, pp. 191–207.

Lee et al., MAPS: Multiresolution Adaptive Parameterization of Surfaces, Computer Graphics Proceedings (SIGGRAPH), 1998, pp. 95–104.

Lodha et al., "Scattered Data Techniques for Surfaces," no date, 42 pages.

Nakamoto Atsuhiro, "Diagonal Transformations and Cycle Parities of Quadrangulations on Surfaces," Journal of Combinatorial Theory, Series B 67, 1996, pp. 202–211.

Nakamoto, Atsuhiro, "Diagonal Transformations in Quadrangulations of Surfaces," Journal of Graph Theory, vol. 21, No. 3, 1996, pp. 289–299.

Yang et al., "Segmentation of measured point data using a parametric quadric surface approximation," Computer–Aided Design 31, 1999, pp. 449–457.

* cited by examiner

METHODS OF GENERATING THREE-DIMENSIONAL DIGITAL MODELS OF OBJECTS BY WRAPPING POINT CLOUD DATA POINTS

This application claims priority to U.S. Provisional Application Serial No. 60/074,415, filed Feb. 11, 1998.

FIELD OF THE INVENTION

This invention is a method for the automatic conversion of a physical object into a 3D digital model. Combined with 3D scanning technologies it can reverse engineer mechanical, organic, and other shapes.

BACKGROUND OF THE INVENTION

The reconstruction of 3D physical objects has applications in various commercial markets and has been practiced in the Arts and in Engineering disciplines. The computational problem of converting physical measurements into a full-fledged digital model has been studied in computer graphics and in computer-aided geometric design, both of which are disciplines within the Computer Sciences.

This invention concerns the automatic conversion of a 3-dimensional physical object into a digital model of exactly the same shape. The method is illustrated in FIG. 1 and the logical steps are depicted in FIG. 2. It starts with measurements taken with a 3D scanner. The measurements are points on the surface, which are automatically converted into a surface description using triangles connected to each other along shared edges. The surface description can either be used to produce a physical copy of the object using a 3D printing machine, and it can be further processed with animation or geometric design software.

The prior art uses a variety of systems to make 3D models of objects including manual and semi-manual solutions. The most frequently used method in the animation industry, where looks are more important than accuracy, is to use patches of spline surfaces which can be fit manually over clouds or sets of measured points. Semi-manual methods are common in the mechanical computer-aided design (CAD) industry where parameterized patches are fit over subsets of the measurements identified in a user-guided process. The commercial software CopyCAD by Delcam, Strim by Matra and Surfacer by Imageware are examples of this strategy.

Assuming the points are already connected to a surface by edges and triangles, there is a variety of methods available for replacing the piecewise linear description by a collection of curved spline patches. Charles Loop Smooth Spline Surfaces over Irregular Meshes (1994) and Jorg Peters, $C^1$-Surface Splines (1995) decompose the triangles into smaller pieces and then replace each piece by a spline patches so the entire surface is continuous and differentiable. Both methods results in a large number of patches, which defeats the main purpose of introducing splines. Venkat Krishnamurthy and Marc Levoy, Fitting Smooth Surfaces to Dense Polygon Meshes (1996) address this shortcoming by manually decomposing the surface into regions and automatically fitting the corresponding spline patches using spring meshes. Matthias Eck and Hugues Hoppe, Automatic Reconstruction of B-Spline Surfaces or Arbitrary Topological Type (1996) automate the entire patch fitting process by first decimating the triangulated surface and then fitting parametrized patches using regression methods. Similarly, Chandrajit L. Bajaj, Jindon Chen and Guoliang Xu, Modeling with Cubic A-Patches (1995) use regression to fit implicit patches over pieces of a triangulated surface. While the latter two methods are automatic in fitting patches, they do not automate the task of shape reconstruction, which is needed to produce the triangulated surface and is a prerequisite of the patch fitting methods.

Among the automatic solutions, three approaches are distinguished: reconstruction from slices, reconstruction from dense measurement, and reconstruction from 3D complexes. The first two approaches are limited to shapes that can be described by a closed surface.

The reconstruction of a surface is considerably easier than in the general case if the measured points represent a sequence of parallel slices. Henry Fuchs, Zvi M. Kedem and Sam P. Uselton, Optional Surface Reconstruction from Planar Contours (1977) show how to connect two polygons in parallel planes with a cylindrical surface of minimum area. The problem is more difficult if there are more than one polygon per slice. Various heuristics for determining which polygons to connect and how to connect them have been investigated. For example, David Meyers, Shelly Skinner and Kenneth Sloan, Surfaces from Contours (1992) use the minimum set of edges that connect all points, known as a spanning tree of the measurements to guide the matching process for the polygons. Jean-Daniel Boissonnat, Shape Reconstruction from Planar Cross Sections (1988) uses the 3D Delaunay complex for both purposes: to decide which polygons to connect and also how to connect them. In spite of the effort reflected in a large body of literature, no algorithm appears to produce surfaces from sliced data in a generally satisfactory manner to produce a 3D model. Nevertheless, the reconstruction from slices is a fast and effective method for simple organic forms, such as eggs, bones, etc. They are part of commercially available systems such as the Cyberware scanners and medical imaging hardware and software.

A method for surface reconstruction that has become popular in the computer graphics community uses the measurements to construct a continuous function defined over the entire three-dimensional space. The surface is reconstructed as the set where the function assumes a constant value. This is the 2-dimensional analogue of the 1-dimensional contour or isoline in geographic maps that traces out a curve along which a possibly mountainous landscape assumes a constant height. The 2-dimensional analogue of an isoline is an isosurface and can be constructed with the marching cube algorithm. Hugues Hoppe, Tony DeRose, Tom Duchamp, John McDonaLD, Werner Stuezle, Surface Reconstruction from Unorganized Points (1992) construct this function so it approximates the signed Euclidean distance from the measured surface. A necessary assumption in their work is that measurement are uniformly dense over the entire surface and that the density exceeds the smallest feature size of the shape. Brian Curless and Marc Levoy, A Volumetric Method for Building Complex Models from Range Images (1996) use information about rays available from some types of scanners to extrapolated the function over gaps in the measured data. A fundamental requirement of this approach is that the signed distance function is differentiable in the normal direction along the entire surface, which is not possible unless the surface is a closed manifold. In other words, the surface is restricted to form the boundary of a solid volume in space. Examples of surfaces that do not satisfy this property are thin sheets or the common case where only a portion of the volume's surface is accessible to measurement.

A 3D complex decomposes a 3-dimensional volume into cells. An example is the Delaunay complex of a point set, which connects the points with edges and triangles and this way decomposes the convex hull of the given points into tetrahedra. Except for Remco Veltkamp, Closed Object Boundaries from Scattered Points (1994) all work on shape reconstruction via 3D complexes is based on the Delaunay complex A representation of the shape is extracted from the complex by selecting an appropriate set of triangles, edges, and vertices. The various approaches differ in their selection process.

Jean-Daniel Boissonnat, Geometric Structures for Three-Dimensional Shape Representation (1984) describes this approach in general terms and gives some heuristics that sculpt a shape by removing tetrahedra from outside in. The weakness of the method is the lack of an effective rule for deciding which tetrahedra to remove and in what sequence. Herbert Edelsbrunner and Ernst Mucke, Three-Dimensional Alpha Shapes (1994) extend the concept of alpha shapes from 2D to 3D and define them as subcomplexes of the Delaunay complex. They give a rule when a tetrahedron, triangle, edge, vertex belongs to the alpha shape. This rule is exclusively expressed in terms of distance relationship, and it succeeds in reconstructing a shape provided the measured data points are uniformly distributed over its surface and possibly its interior: Chandrajit Bajaj, Fausto Bernardini and Guoliang Xu, Automatic Reconstruction of Surfaces and Scalar Fields from 3D Scans (1995) exploit alpha shapes for that purpose and report limitations resulting from this requirement.

SUMMARY OF THE INVENTION

The shape reconstruction part of this invention, referred to as wrap process, overcomes the past limitations. It also uses the Delaunay complex, but differs from all above methods by an effective selection rule that is unambiguous and does not depend on the uniformity and density of the point distribution.

The differences between the invention described in this application and other methods can be grouped into primarily theoretical, practical, or paradigmatic. The most important theoretical differences to other shape reconstruction methods are that the wrap process (I) can deal with any set of 3D point measurements, and (II) uses rational and justified rules.

Both theoretical differences have important practical and also paradigmatic consequences. Point (I) refers to the fact that most earlier methods limit the set of measurements to certain types in order to eliminate ambiguities in the reconstruction of the shape. The wrap process includes global topological considerations that disambiguate every set of measurements. Point (II) refers to the fact that the surface reconstructed by the wrap process can be defined, and the wrap process is merely an execution of that definition. All other reconstruction methods, with the exception of alpha shapes, leave some ambiguity to be resolved by the implementation. It is therefore not possible to predict the exact shape without executing the implementations.

The three most important practical advantages of the wrap process are direct consequences of the theoretical differences just mentioned:

(I) the wrap process can work in connection with any 3D scanner,
(II) the reconstruction is fully automatic,
(III) the resulting shape has a representation that permits editing, if desired.

Point (I) says that the invention provides a standard and universal interface to 3D point input devices. Current 3D scanners differ dramatically in quantity and quality of the 3D measurements, and they also differ in the kind of information they provide. As a lowest common denominator, each measurement is reported with enough information to unambiguously determine its location in space, e.g. in terms of Cartesian coordinates. Sometimes the measurement includes a half-line along which the measurement was made, or the color and texture of the object at the measured location. The quantity of measured points depends on the technology and ranges from just a few points per second for touch-probe devices to a few hundred thousand points per second for large laser range equipment.

Point (II) asserts that the wrap process is fully automatic, which is a decisive factor in many commercial applications, such as software used inside 3D copiers, 3D printers and 3D fax machines. Point (III) refers to the fact that the resulting shape can still be edited. This does not contradict the claim that the reconstruction is automatic but rather refers to imperfections due to incomplete and noisy measurements, and to situations where the original model is to be modified, for example to make small variations of the same design.

The invention described implies a major improvement of the physical design paradigm, which operates through copying physical objects into the digital domain. It is generally complementary to conceptual design paradigm, which provides tools to manually generate digital models on the computer.

In manufacturing, physical design is often referred to as reverse engineering since shape information is copied rather than created from engineering drawings. A major innovation brought about by this invention is that the process is now automatic. Another difference is how the physical design process is implemented results from an improvement of the basic invention, where the shape is reconstructed incrementally. Because the shape is uniquely defined for any set of measurements, also the changes necessary to reflect new and additional measurements are unambiguously defined. It is therefore possible to run the measuring and reconstruction steps of the entire process in an interleaved fashion.

An important practical consequence of this novel possibility is that large sets of measurements can now be filtered. All measurements are read and considered, but only the ones that makes a contribution and differences in the reconstructed shape are incorporated into the digital representation. This alleviates the currently most severe limitation shared by all shape reconstruction methods, which is the inability to digest large sets of measured data due to the limited availability of hardware memory.

BRIEF DESCRIPTION OF FIGURES

The present invention is shown in the accompanying drawings.

DETAILED DESCRIPTION OF PREFERRED EMBODIMENT

Figure 1:
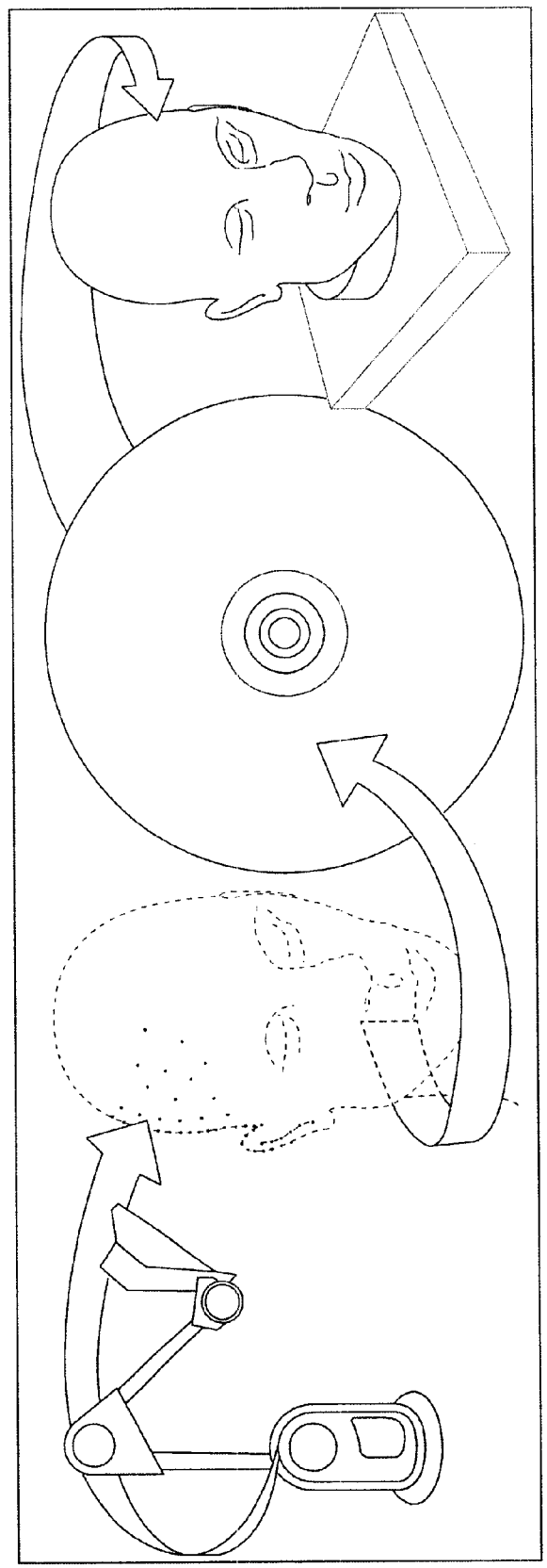
FIG. 1 illustrates the Wrap process that automatically converts physical into digital information.
Figure 2:
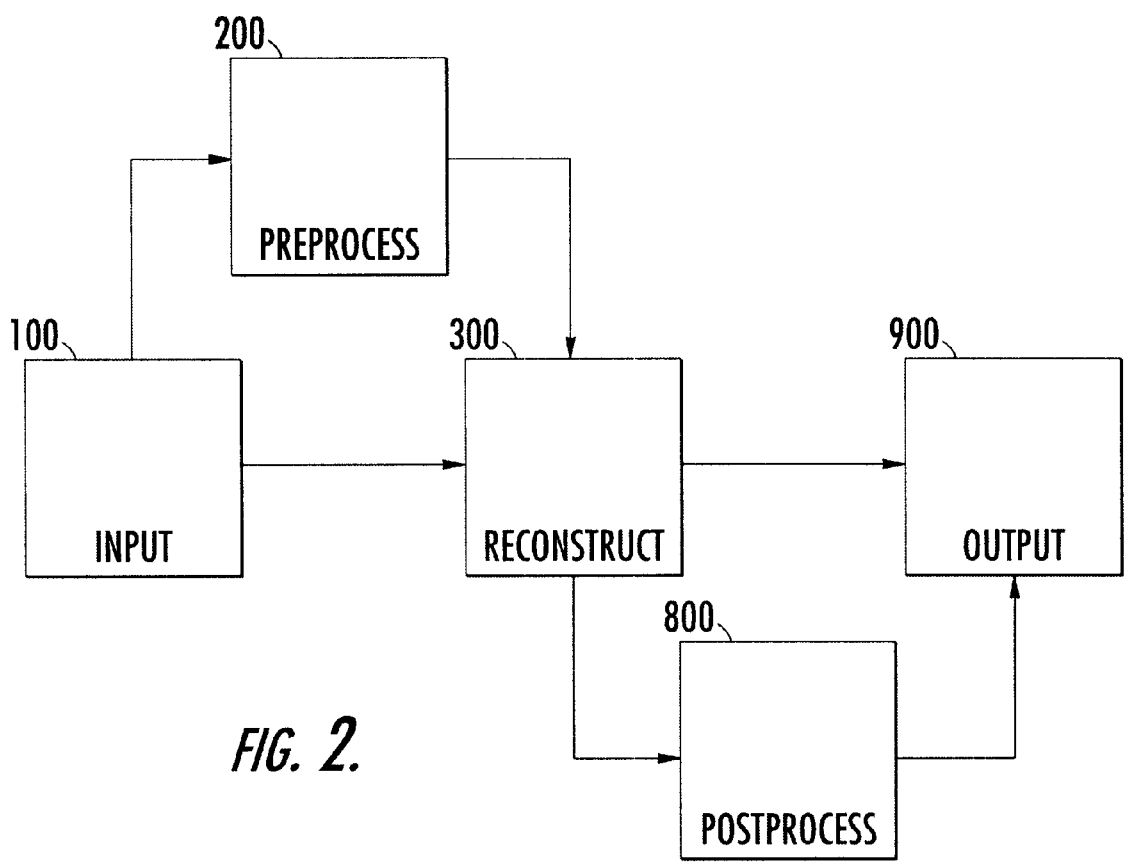
FIG. 2 illustrates the steps of method to automatically produce a digital model of the same shape as a physical object.

The invention described in this application provides a method for the automatic conversion of a physical object into a 3D digital model that precisely replicates its shape. The method consists of five steps as illustrated in FIG. 2:

(1) 3D scanning 100 which measures points on the surface of the object, (2) optional data preparation 200 to preprocess the measurements, (3) shape reconstruction 300 connecting neighboring surface points with edges and triangles, (4) optional shape improvement 800 to postprocessing the digital model, (5) output the model 900 in a format acceptable for 3D printing and software for animation and geometric design.

The difficulty in converting a physical object to a digital model has long been a stumbling block in the development of commercially viable reverse engineering solutions to customized manufacturing and 3D copying and printing. According to the principles of the present invention, it will be economically feasible to use physical design in industries where uniqueness and faithful representation are of critical importance. Examples are reverse engineering of human body parts, such as teeth and blood arteries in medical CAD applications, and the customized manufacturing of high-end consumer goods, such as ski boots and artificial hairpieces. Physical design measures a physical object with the goal to generate a precise digital model of that object. This process is also referred to as reverse engineering. Traditional conceptual design starts with an idea and often with a hand drawing, and a digital model is generated from scratch using modeling software. Although conceptual design is slow and expensive, it has dominated mechanical CAD during the last 20 years. It might be acceptable to spend months and dollars to design a computerized 3D model for certain objects like a new car because the same design will be duplicated with the same shape and form in production. However, in many fields where customized design and organic shapes are essential, the conceptual design paradigm is cost-inhibitive and impractical. Moreover, conceptual design cannot build precise digital models for organic shapes. These shortcomings are the main reason that CAD has not been applied more broadly in medical markets and it is not used to drive 3D copiers, 3D printers, and 3D fax machines.

The first step in the present invention is data acquisition 100. Data acquisition hardware and software is known in the prior art and has been developed and manufactured by independent hardware and software companies. The present invention provides an interface to data acquisition machines or software packages that produce 3D point cloud data where each point is described by its three Cartesian coordinates. Some known manufacturers of data acquisition machines are manufacturers of 3D sensing/digitizer systems including laser scanners, coordinate measuring machines, x-ray scanners (non-medical), and mechanical arm digitizers, such as 3D Research, Aracor, Bertin, etc.; MRI (magnetic resonance imaging), such as General Electric Medical Systems and Siemens Medical Systems, Inc.; X-ray and Digital X-ray such as General Electric Medical Systems and Picker International; and other methods produced by ultrasound, satelite imaging, nuclear medical imaging, cat scan, sonar and radar.

There are also practiced mechanisms to generate 3D point data with computer software. The described invention is still applicable for use with that software, and the only necessary modification is that physical data acquisition 100 is replaced by data computation. The software methods generating 3D point data include computational sampling of digital models stored in other formats; automatic point placement, as commonly practiced in mesh generation; computer simulation of particle systems, such as galaxies in the universe and molecules in airflow; crystallographic defraction pattern analysis, as practiced to study conformations of molecules; and recording states of simple dynamical systems.

The described invention requires only a minimum amount of information from the measured points namely their Cartesian coordinates. The result is a versatile reconstruction process that can be combined with any one of the above data acquisition methods.

The second step of the invention is preprocessing 200 that prepares the data for the shape reconstruction 300. It is optional and generally manual since the lack of any structural information at this stage prevents operations that are reasonably powerful and generally meaningful. However, in applications where different data sets share common characteristics, the present invention can define templates of point processing operations that can then be automatically applied to any data set.

The reasons for preprocessing the point data before reconstructing the shape are varied. The data set may be large and a rough approximation of the shape can be quickly constructed from a randomly sampled subset. The data may be noisy and obvious outlayers can be removed manually with the help of a graphics user-interface. More subtle effects of noise can be treated after completing the reconstruction of the shape, as explained shortly. Finally, the data may comprise several shapes or a larger fraction of a shape than desired and by eliminating the rest of the data the reconstruction effort can be focused. The main operations facilitating the data preparation are random and manual sampling. Subsets of the data can be specified by drawing regions in 3D and such subsets can be cropped, erased, or sampled down to a specified percentage.

Figure 3:
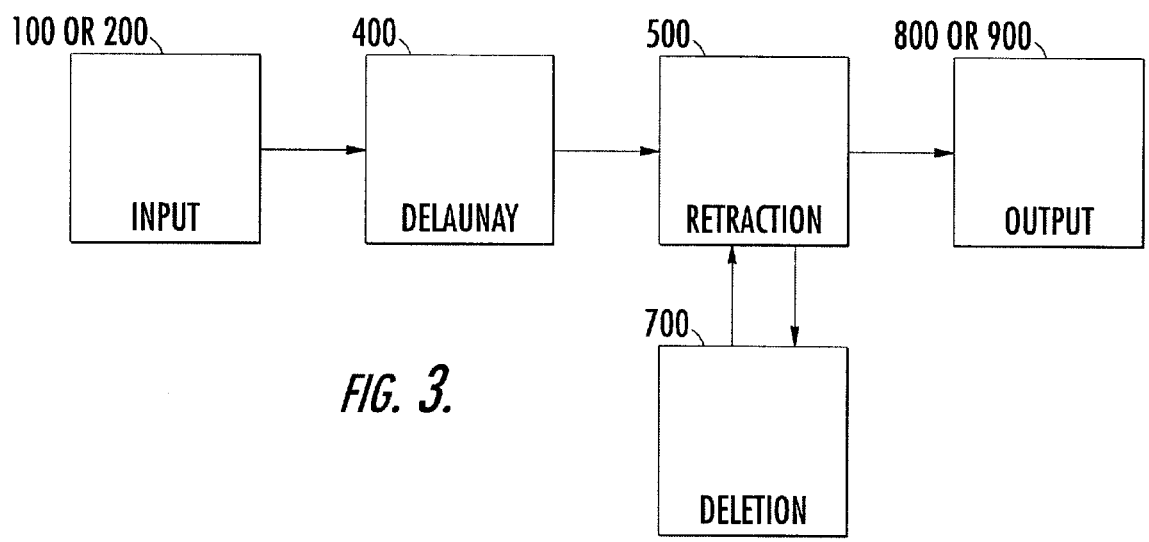
FIG. 3 illustrates the steps of an automatic shape reconstruction with optional shape editing.

Reconstruction 300 is an integral aspect of the present invention. It accepts a cloud of 3D points and reconstructs the shape from which these points are sampled. The logical steps of the method are shown in FIG. 3. Further details are developed below.

Optional shape improvement 800 is similar to the second step and is facilitated by one or several of a list of operations that improve the shape and data set. The step is optional and the shape can be output directly after reconstruction 300. The shape improvement 800 operations are generally more powerful than the data preparation operations as they can exploit all the structural information generated by the shape reconstruction 300. In particular, points are now connected by edges and triangles to form a surface in 3D. If the surface is closed, it has a well-defined sense and separates bounded volume on one side from unbounded volume on the other.

The shape improvement 800 operations include data relaxation, surface refinement, surface decimation, surface thickening, and mesh quality improvement.

In data relaxation, rugged surface patches are smoothed by filtering out high frequencies while preserving the main shape charateristics determined by low variation frequencies. This operation is useful in removing a common type of noise generated by data where points are measured with limited accuracy. The relaxation is achieved in rounds, and each round averages the location of every data point with the locations of its neighbors.

In surface refinement, the triangulated surface is refined by decomposing edges and triangles into smaller pieces. The 3D locations of the new vertices are computed as weighted averages of neighboring points. At the same time, the locations of the original vertices are adjusted to achieve a smoothing effect that avoids sharp corners and edges.

In surface decimation, the number of triangles describing a surface is reduced to a specified percentage. In many cases, decimation is motivated by considerations aimed at reducing the memory requirements or to speed up rendering. The triangle count is reduced by eliminating the least significant data points or by merging several points to a common central location. It is important that the reduction is sensitive to shape characteristics and preserves local curvature to the extent possible.

In manufacturing, only shapes with non-zero thickness can be fabricated. The thickening operation turns a flat surface into a solid object of strictly positive thickness. This amounts to constructing two copies of the surface, moving them apart by a specified distance, and connecting them along the boundary. The off-setting motion is to be done locally in the direction normal to the surface to guarantee uniform thickness over the entire surface.

Numerical methods such as finite element analysis use meshes to compute physical properties that drive the simulation of physical phenomena. The methods rely on the good quality of the elements, which in the case of a triangulated surface means the angles of the triangles are neither very small nor very large. Angles can be improved locally by refining triangles, flipping edges, or through other local restructuring operations.

Producing output 900 is the last step of the present invention. It is the final link that turns the idea of physical design into a functional process. Output is generated for two major purposes: for fabricating physical objects using 3D printing hardware, and for storing and modifying digital models with 3D animation and CAD software. In the prior art there are many known hardware manufacturers for fabricating physical objects from digital models including: 3D Systems, Inc., Kira Corp., BPM Technology. In addition the prior art knows of many software packages that accept digital models for further processing as developed and marketed by Alias|Wavefront, Softimage, Lightwave, etc.

The core of the physical design paradigm is the reconstruction 300 of the shape from a collection of point measurements. To achieve a method that is as general as possible, we assume a minimum amount of information, namely only the position of the measured points in 3D, which are given by their Cartesian coordinates.

An overview of the shape reconstruction method is given in FIG. 3. Besides the input and output there are three major steps:

(1) the construction 400 of the Delaunay complex of the measured points, (2) the retraction 500 of the Delaunay complex to a description of the shape, (3) the optional geometric editing 700 of the shape description.

Delaunay complexes and algorithms for constructing them are known in the prior art. The retraction method 500 is based on continuous and discrete notions of flow that connect tetrahedra, triangles, edges, and vertices of the Delaunay complex in a geometrically meaningful way. The details of the retraction are explained after describing the flow and how it is computed. Finally, the optional step of editing the shape through deletions followed by local retractions is discussed.

Let S be a finite set of point measurements in 3D. The Delaunay complex is uniquely defined by S and decomposes the convex hull into tetrahedra that share triangles, edges, and vertices. The vertices of the complex are exactly the points of S. Two points are connected by an edges, three points by a triangle, and four points by a tetrahedron if the points satisfy a certain proximity condition formulated in terms of spheres. Specifically, two vertices p and q are connected by an edge, pq, in the Delaunay complex if there exists a sphere passing though p and q so all points lie strictly outside the sphere. Similarly, three vertices p, q, r so all other points lie strictly outside the sphere. Finally, four vertices p, q, r, s belong to a tetrahedron, pqrs, if all other points lie strictly outside the unique sphere passing through p, q, r, s.

Provided the points in S are in non-degenerate position, the above conditions define a simplicial complex that decomposes the convex hull of S. To describe what this means, the present invention uses the term simplex to denote a general element of the Delaunay complex; it can be a vertex, edge, triangle, or tetrahedron. Different types of simplices are distinguished by their dimensions. For example, a tetrahedron has dimension 3 and is also referred to as a 3-simplex. The dimensions of a triangle, edge, vertex are 2, 1, 0, respectively. The simplices in the boundary of a given simplex, σ, are the proper faces of σ. The faces are all proper faces together with σ, which is an improper face of itself. If τ is a face of σ then σ is called a coface of τ, and σ is a proper coface if τ is a proper face. A set of simplices is a simplicial complex if the following two conditions are satisfied:

if σ is a simplex in the set and τ is a face of σ then τ also belongs to the set, if σ, σ' are two simplices in the set then they are either disjoint or they intersect in a common face.

As mentioned earlier, the sphere condition for edges, triangles, tetrahedra specifies a simplicial complex that decomposes the convex hull provided the points lie in non-degenerate position. Otherwise, there exists an infinitesimal perturbation of S that specifies such a simplicial complex. The algorithm can be combined with a method described in Herbert Edelsbrunner and Ernst Mucke, Simulation of Simplicity: a General Method to Cope with Degeneracies in Geometric Algorithms (1990) that simulates such a perturbation, if necessary, and ensures it produces a set of simplices with the appropriate properties. For a fixed infinitesimal perturbation this complex is unique.

Figure 4:
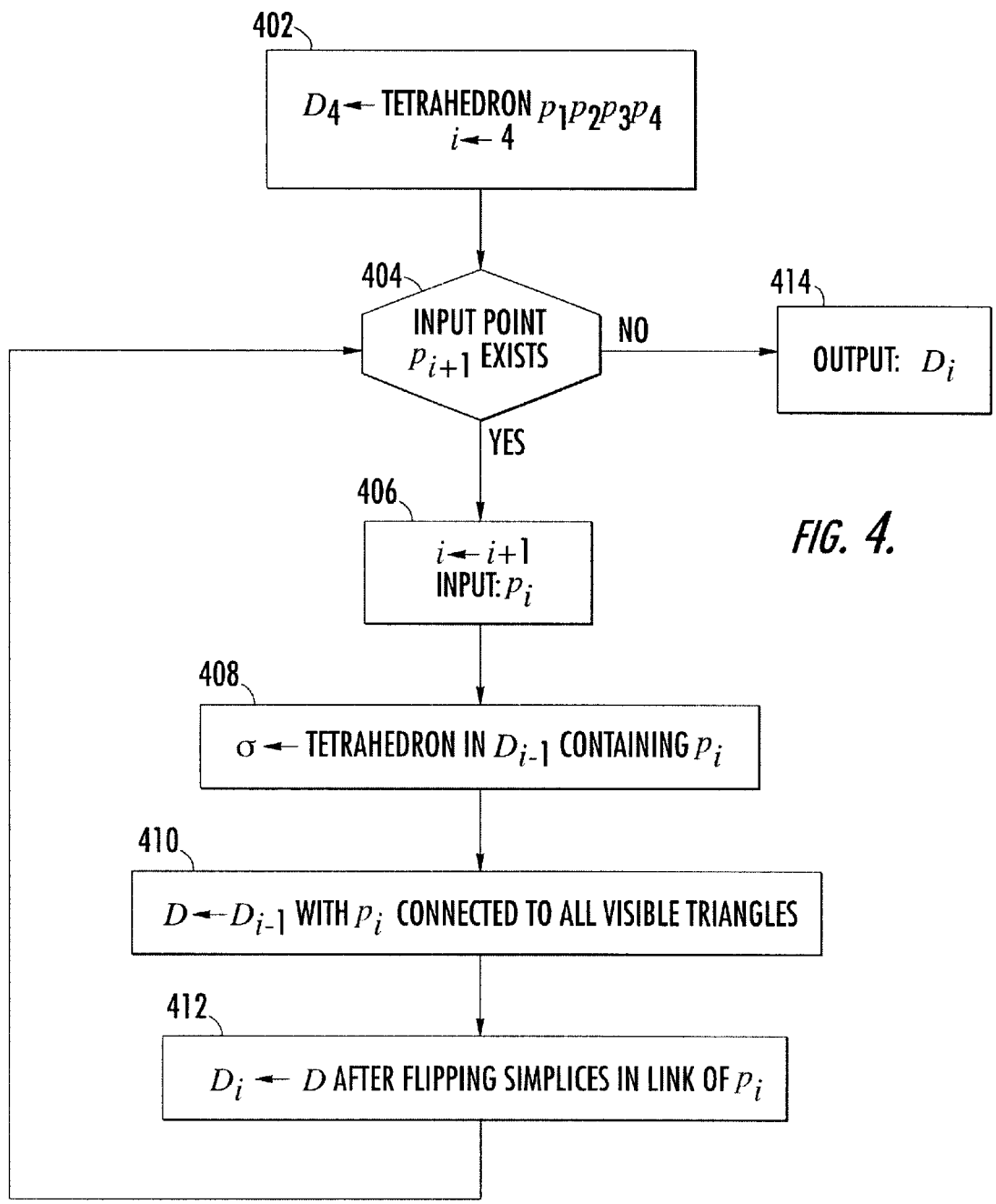
FIG. 4 illustrates the steps of incremental construction of Delaunay complex.

The algorithm used to construct the Delaunay complex is incremental and it adds a point at a time to the complex. Versions of the incremental algorithm have been published by Adrian Bowyer, Computing Dirichlet tessellations (1981), Barry Joe, Construction of 3-Dimensional Delaunay Triangulations Using Local Transformations (1991), and others. An embodiment of the present invention may utilize an algorithm for constructing a 3-dimensional Delaunay triangulation (tetrahedrization). An exemplary algorithm for constructing a 3-dimensional Delaunay triangulation is described in articles by H. Edelsbrunner and N.R. Shah et al., entitled "Incremental Topological Flipping Works for Regular Triangulations", published in Algorithmica, Vol. 15, pp. 223-241 (1996) and Proceedings of the $8^{th}$ Annual Symposium of Computing Geometry, pp. 43-52 (1992). In FIG. 4, the construction of a 3-dimensional Delaunay triangulation starts in Step 402 with the first four points and initializes the Delaunay complex to the tetrahedron, $p_1 p_2 p_3 p_4$ and to all its faces, namely four triangles, six edges, and four vertices. To describe the general step let $D_{i-1}$ denote the Delaunay complex for the first i-1 points and let $p_i$ be the new point that is to be added, in Step 406. If there is no new point at Step 404 then the algorithm halts and returns to Step 414 with the complex constructed so far. Otherwise, the tetrahedron $\sigma$ in $D_{i-1}$ that contains $p_i$ is determined, in Step 408. If $p_i$ lies outside the convex hull of the first i-1 points then $\sigma$ does not exist. In either case, $p_i$ is first connected to all visible triangles, edges, and vertices, in Step 410. If $\sigma$ exists then this is done by connecting $p_i$ with four tetrahedra to the four triangles of $\sigma$. Otherwise, $p_i$ is connected by a tetrahedron to every convex hull triangle visible from $p_i$. The result is a simplical complex that is converted to the Delaunay complex in a sequence of flips, in Step 412.

Figure 5:
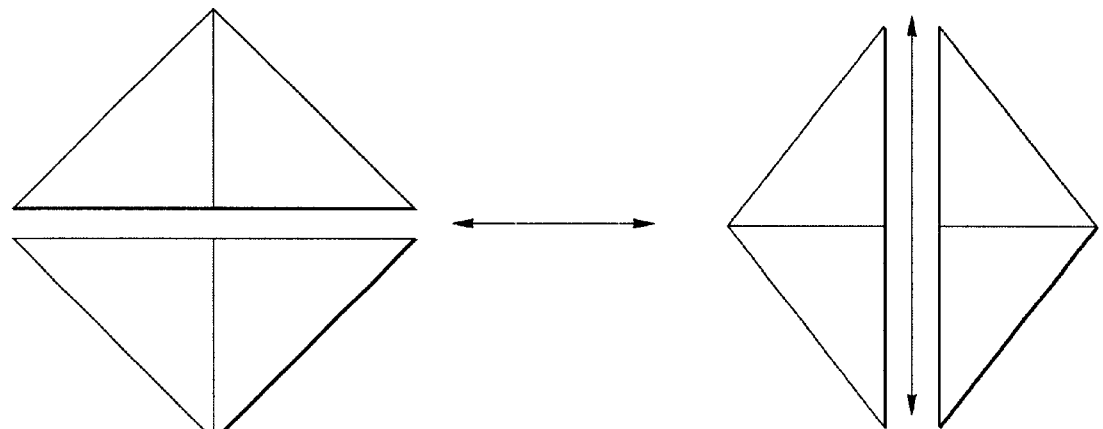
FIG. 5 illustrates a flip that replaces two by three or three by two tetrahedra.

Let the link of $p_i$ be the collection of triangles, edges, vertices connected to $p_i$ tetrahedra, triangles, and edges. Right after adding $p_i$ the link consists exactly of all visible triangles, edge and vertices. The Delaunay complex of the first i points can be obtained by flipping triangles in the link of $p_i$ that locally violate the sphere condition. As illustrated in FIG. 5, such a flip either replaces 2 tetrahedra by 3 tetrahedra or 3 tetrahedra by 2 tetrahedra, and in each case the new tetrahedra occupy the same space as the old ones. The first case arises when the two tetrahedra on both sides of the offending triangle form a convex double-pyramid. The second case arises when the two tetrahedra form a non-convex double-pyramid and there is a third tetrahedron that fits into the cavity and together the three tetrahedra form a convex double-pyramid. The second type of flip can be viewed as the reverse of the first type of flip.

The retraction method uses an order relation of the simplices in the Delaunay complex. This is a partial order; in other words, for some pairs of simplices, $\sigma$, $\tau$, no order is defined and for the others the present invention has either $\sigma$ before $\tau$ or $\tau$ before $\sigma$. A piecewise continuous flow passes through the simplices in the order of the relation. Because of the importance of the flow idea to this invention, it is discussed in some detail: first the piecewise continuous flow concept and second the discrete implementation.

Consider the distance map $f$ that assigns to each 3D point $\chi$ the distance to the closest point in the set of measurements, S. The gradient of $f$ is a vector $\nabla f(\chi)$ in the direction along which $f$ increases the fastest if $\chi$ were moved. For example, if p in S is closer to $\chi$ than any other point of S then the gradient points in the direction away from p: $\nabla f(\chi) = c \cdot (\chi - p)$ for some positive real c. If p and q in S are both closest to $\chi$ then $\chi$ lies in the plane halfway between p and q, and the gradient points in the direction away from the halfway point: $\nabla f(\chi) = c \cdot (\chi - (p+q)/2)$. Similarly, if there are 3 closest points then $\chi$ lies on the line equidistant to the points. If the 3 points surround the line then moving $\chi$ off that line would locally decrease $f$ so the gradient is parallel to the line and points in the direction away from where the line meets the plane that passes through the 3 points. If the points do not surround the line then the gradient is defined by 2 of the 3 points. Finally, if there are 4 closest points then $\chi$ lies at the center of the unique sphere that passes through the points. If the points surround $\chi$ then any motion would locally decrease $f$ so the gradient is the zero-vector. Otherwise, the gradient is defined by 3 or by 2 of the 4 points.

Figure 6A:
FIGS. 6a–c illustrate the continuous vector field obtained by smoothing the piecewise linear vector field for flow on and near centered, confident, equivocal edge, respectively.
Figure 6B:
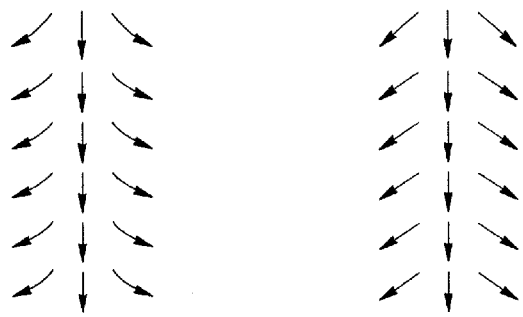
Figure 6C:
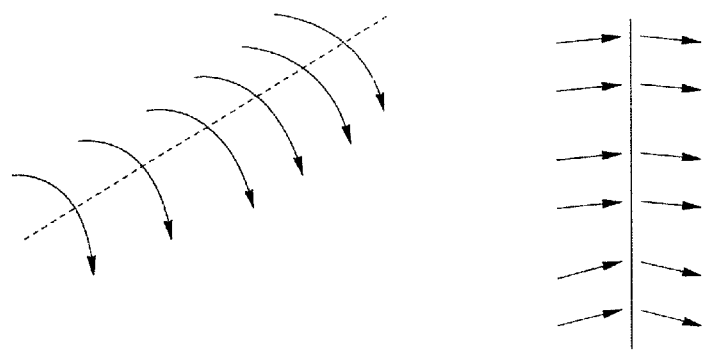

The gradient vector is defined at every location $\chi$ in 3D space, and the collection of them forms a vector field. Using standard bump functions the vector field can be made continuous and studied with methods from Morse theory, which is a discipline within Mathematics. The effect of making the vector field continuous is illustrated in FIGS. 6a–c for flow on and near an edge. The right column in FIGS. 6a–c shows the piecewise linear flow at and near three different types of edges for a centered, confident and equivocal edge, respectively. In each case the gradient changes direction suddenly as the point moves across the edge. The left column in FIGS. 6a–c shows the continuous flow where the gradient turns smoothly even as the point moves across the edge for the centered, confident and equivocal edge, respectively. In the non-degenerate case the continuous vector field is zero only at a finite number of points called the critical points. Each critical point has an index, which is one less than the number of closest points in S. Critical points of index 0 are sources of the flow. These are very instable points and any small motion enters a flow that carries the point away from the source. Critical points of index 1 and 2 are saddles. They are also instable although the former has a single line of motions that runs into opposing flow which brings the point right back to the saddle, and the latter has a plane of such motions. Finally, critical points of index 3 are sinks. These are stable points since every small motion runs into opposing flow that returns the point to the sink.

Figure 7A:
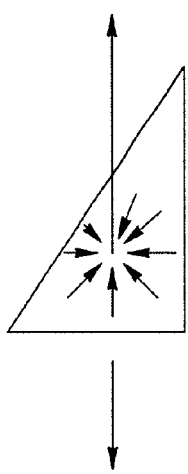
FIGS. 7a–c illustrates the piecewise linear vector field at a centered, confident, equivocal triangle, respectively.
Figure 7B:
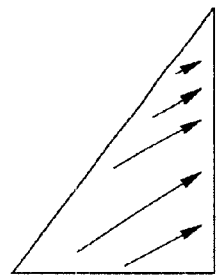
Figure 7C:
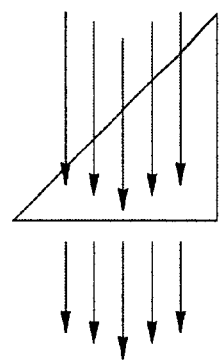

Note that the points in S that are closest to a 3D point $\chi$ are the vertices of a simplex in the Delaunay complex. The simplices that correspond to critical points are referred to as centered; they do not have any successors in the flow relation. Besides centered ones there are two other types of simplices. A simplex, $\tau$, is confident if its vertices are closer to the center z of its smallest sphere than any other points in S, but they do not surround z else $\tau$ would be centered. Finally, $\tau$ is equivocal if S contains points that are closer to z than the vertices of $\tau$. FIGS. 7a–c illustrates the different flow behavior of centered, confident, and equivocal simplices for the case of triangles, respectively:

In FIG. 7a, a centered simplex $\tau$ contains its flow and thus has no successors, In FIG. 7b, a confident $\tau$ has its flow in the same line, plane, space that contains $\tau$; all its successors are faces, In FIG. 7c, an equivocal $\tau$ has its flow go sideways through it; all its successors are cofaces.

Figure 8:
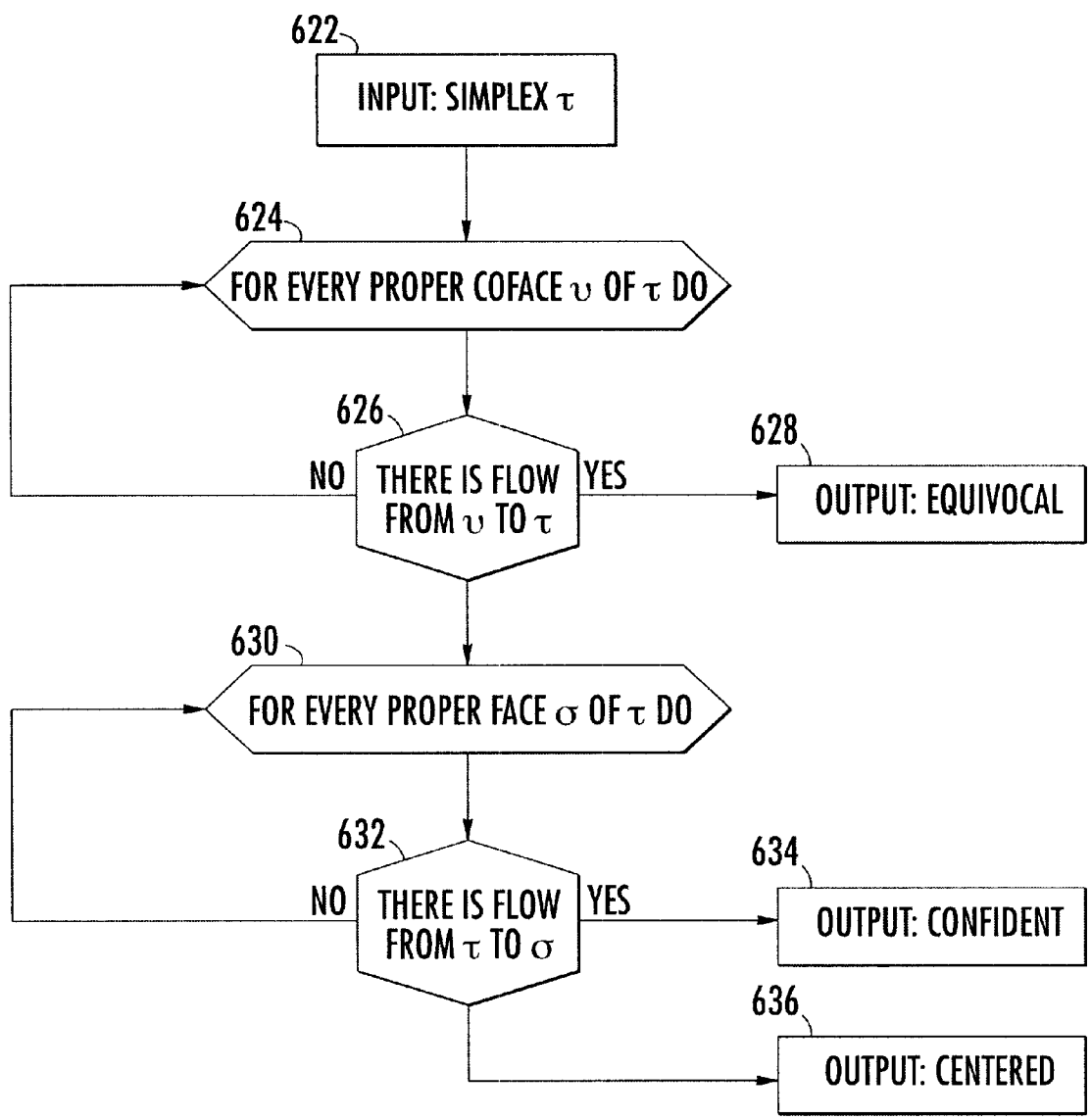
FIG. 8 illustrates the steps of determining the type of a simplex.

FIG. 8 illustrates the logical steps involved in determining the type of a simplex. After reading 622 the input simplex, $\tau$, we test whether there is flow to any of its proper cofaces in Steps 624 and 626. If there is then τ is equivocal as determined in Step 628. Otherwise, we test whether there is flow to any of its proper faces in Steps 630 and 632. If there is then τ is confident, as determined in Step 634, and if there is not then τ is centered, as determined in Step 636.

Two of the logical steps in FIG. 8 test whether or not there is flow from one simplex to another. Assume τ is a proper face of σ and consider FIG. 9 which illustrates the logical steps that determine whether or not there is flow from σ to τ. After reading 582 the input simplices τ and σ, where τ is a face of σ, we determine whether or not there is elementary flow from σ to every face υ that contains τ and whose dimension is only 1 less than that of σ, in Steps 584 and 586. If there is then there is flow from σ to τ, as determined to Step 590, and if there is not then there is no flow from σ to τ, as determined in Step 588. If, on the other hand, τ is a proper coface of σ then the existence of flow from σ to τ is decided by considering all simplices υ that are cofaces of σ and faces of τ and the dimension of υ is 1 less than the dimension of τ. There is flow from σ to τ exactly if all such υ are equivocal and there is no elementary flow from τ to υ. The logical steps for determining elementary flow are illustrated in FIG. 10. By definition, such flow exists from a simplex σ to a face τ only if the dimension of τ is exactly 1 less than that of σ. After reading 602 the input simplices τ and σ, where τ is a face of σ, we make sure in Step 604 that that requirement is satisfied. σ exactly one vertex that is not also a vertex of τ. We compute that vertex, p, and the smallest sphere, K, that passes through all vertices of τ, in Step 606. If p lies inside K, as determined in 608, then there is elementary flow, as determined in 610, and otherwise there is no elementary flow, as determined in 612.

Figure 9:
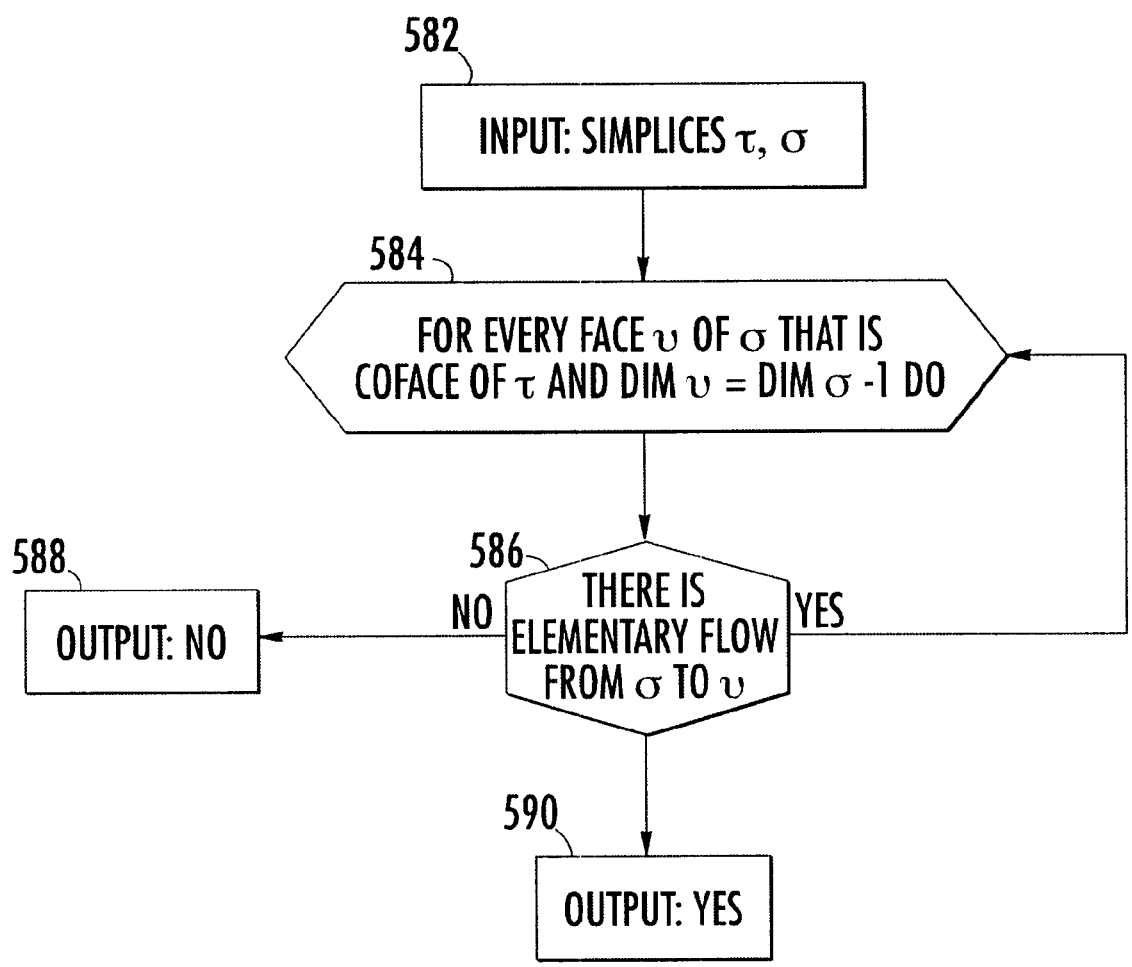
FIG. 9 illustrates the steps to test whether there is flow.
Figure 10:
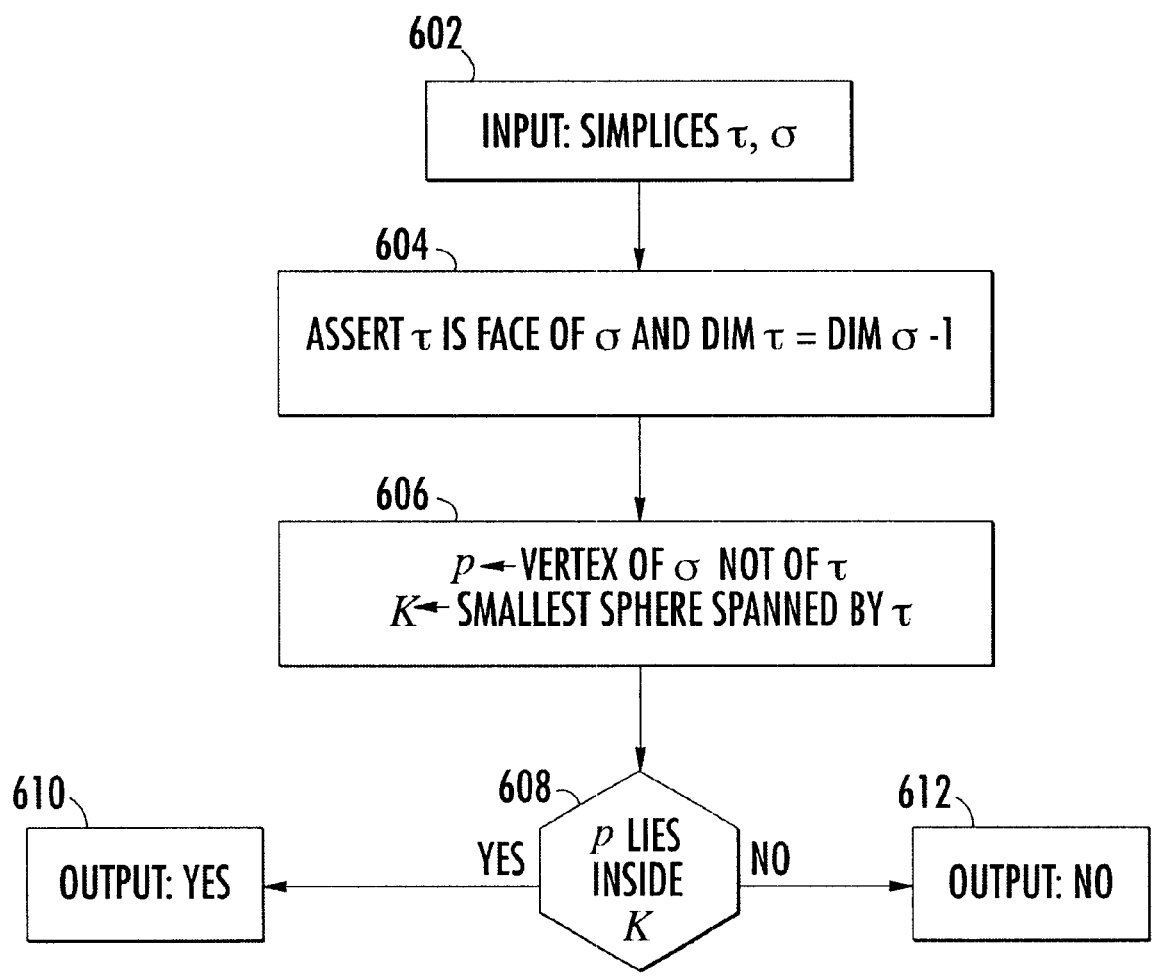
FIG. 10 illustrates the steps to test whether there is elementary flow.

The flow relation defined by the decision algorithm in FIG. 9 has three important properties exploited by the reconstruction method:

(A) The flow relation is acyclic.
(B) Each equivocal simplex has a unique predecessor in the flow relation.
(C) All successors of a confident simplex share the lowest-dimensional successor as a common face.

Figure 11:
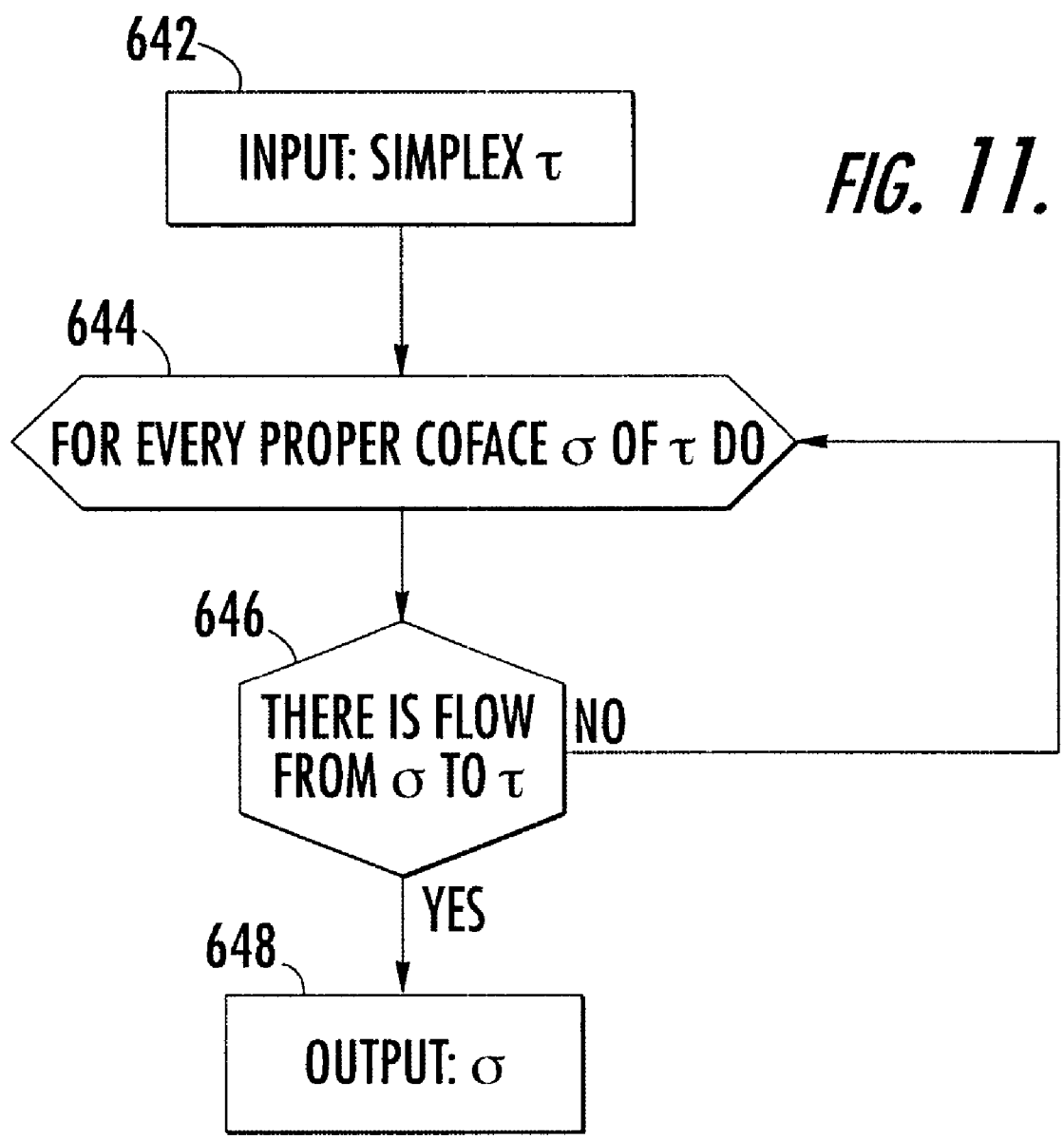
FIG. 11 illustrates the steps of finding the unique flow predecessor of a simplex.
Figure 12:
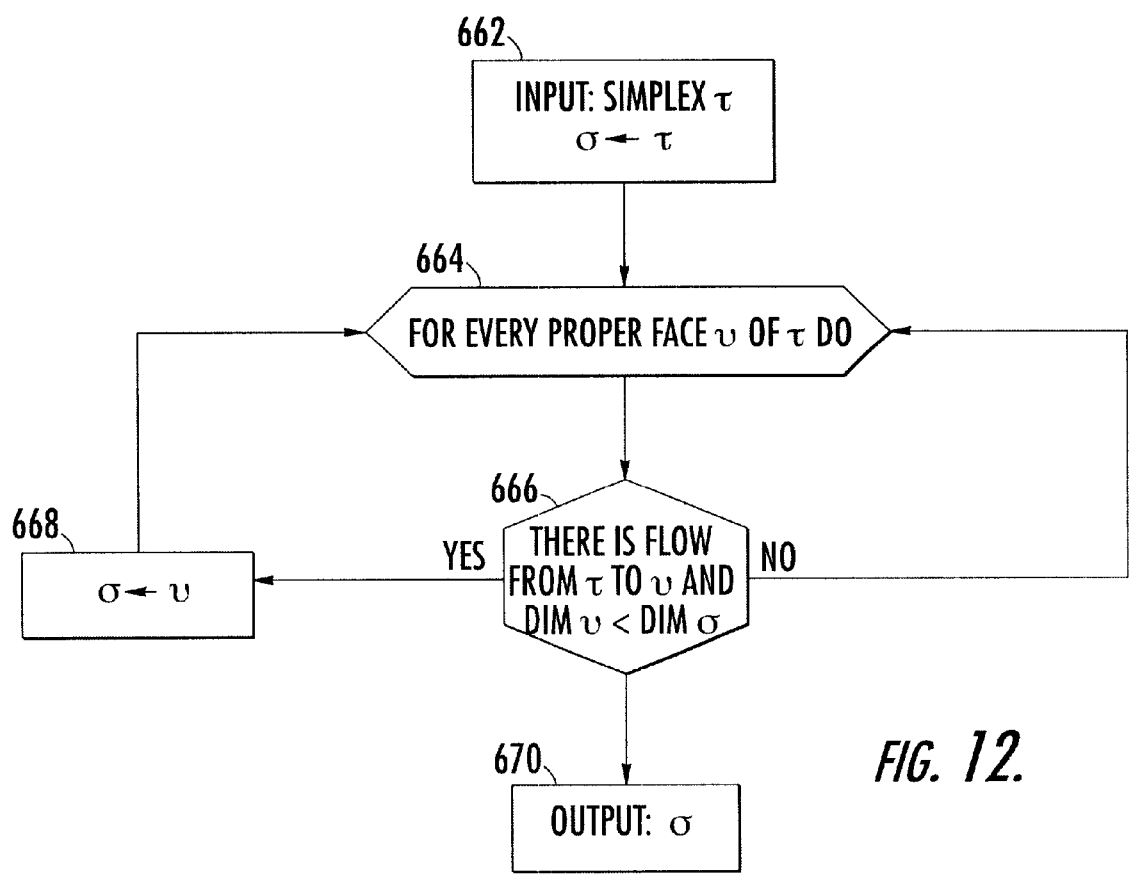
FIG. 12 illustrates the steps of finding the lowest-dimensional flow successor of a simplex.

Property (A) is an important global property of the flow that is necessary for proving the consistency of the entire reconstruction method. FIG. 11 illustrates the logical steps that determine the unique flow predecessor of an input simplex, τ, beginning in Step 642. We test every proper coface σ, in Steps 644 and 646, and we output the one that has flow to τ, in Step 648. Property (B) guarantees that there is exactly one such coface. FIG. 12 illustrates the logical steps that determine the lowest-dimensional flow successor of an input simplex τ, beginning in Step 662. We consider every proper face υ of τ, in Step 664, and compute σ as the lowest-dimensional υ with flow from τ to υ, in Steps 666 and 668. The simplex σ is the desired successor of τ, as determined in Step 670.

Figure 13:
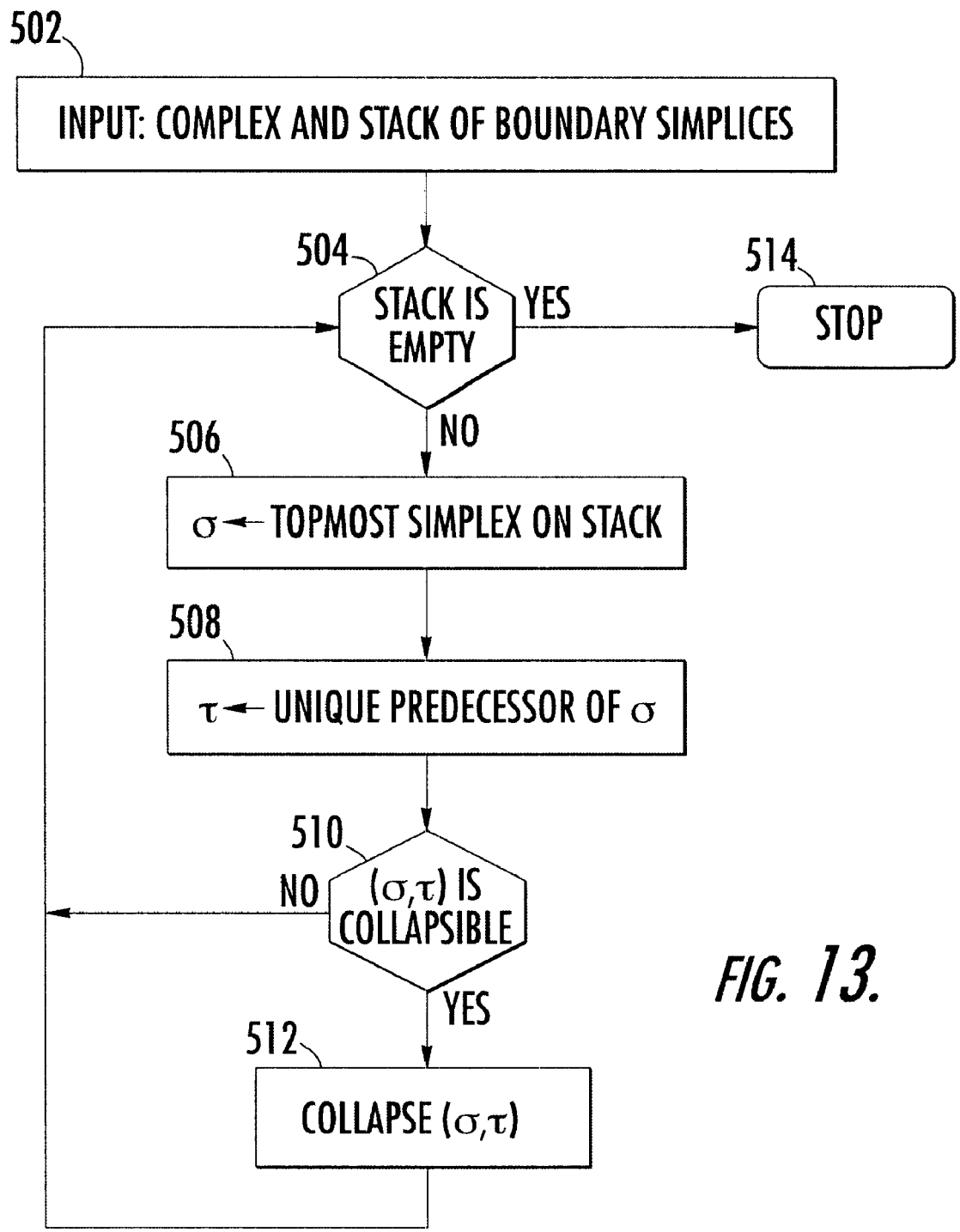
FIG. 13 illustrates the steps of retraction of Delaunay complex by collapsing simplices.

The automatic reconstruction 300 obtains a description of the shape by a retraction that starts at the boundary of the Delaunay complex. The process is illustrated in FIG. 13. The input complex is the entire Delaunay complex and the input stack contains all boundary simplices, beginning in Step 502. The retraction proceeds in Step 512 by collapsing all collapsible simplex pairs found in Step 510 that are identified in Step 506 by simplices on the stack. The retraction stops in Step 514 when there are no more simplex pairs to consider in Step 504.

Figure 14:
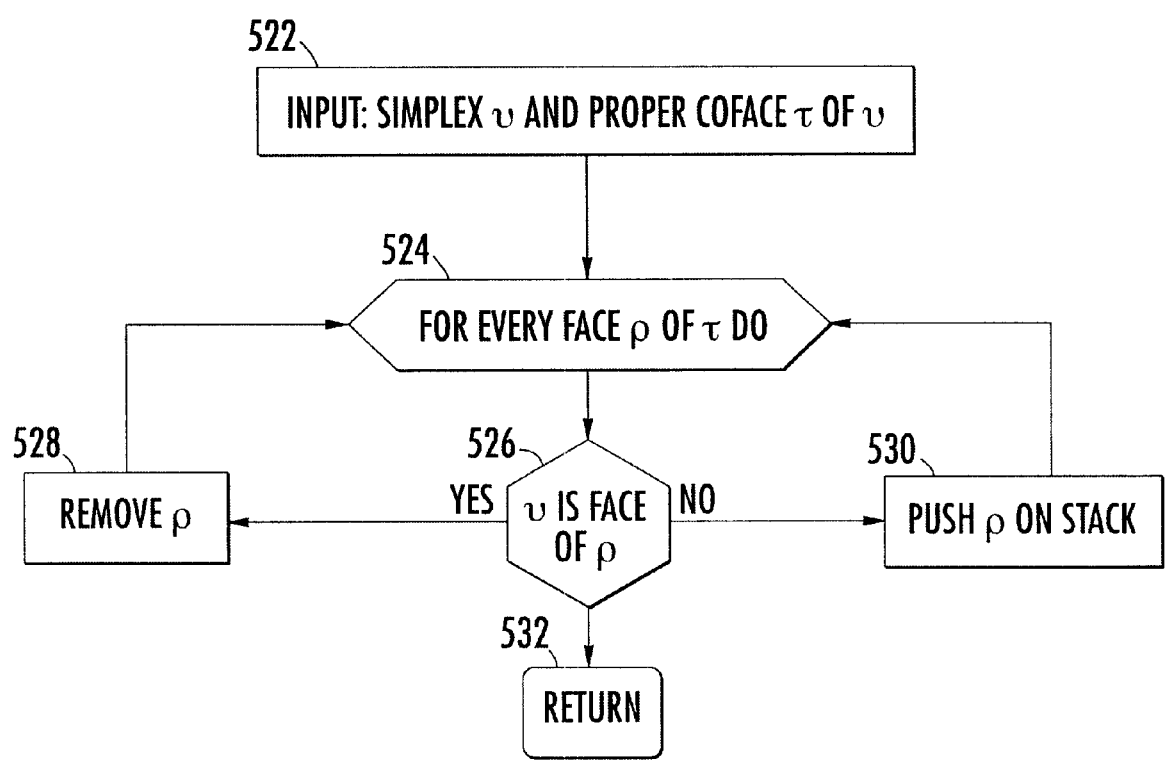
FIG. 14 illustrates the steps of collapsing a simplex pair and recycling simplices for further retraction.
Figure 15A:
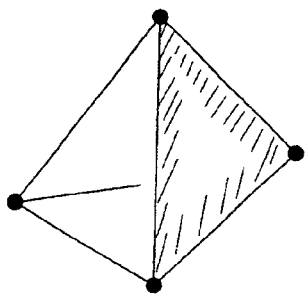
FIGS. 15a–f illustrates the six types of collapses that remove the tetrahedron, all shaded triangles, all dashed edges, and all hollow vertices, respectively.
Figure 15B:
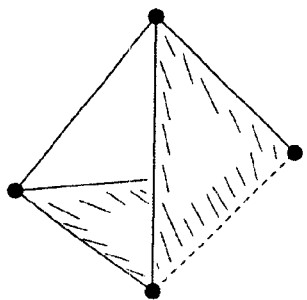
Figure 15C:
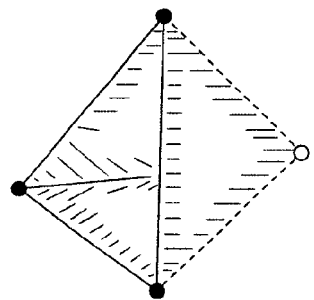
Figure 15D:
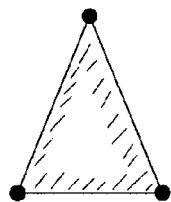
Figure 15E:
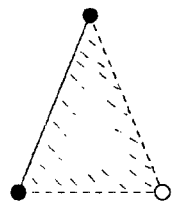
Figure 15F:

The logical steps of a collapse are illustrated in FIG. 14. A collapse is determined by a pair of simplices where one is a proper face of the other: $\upsilon \subseteq \tau$. There are six types of collapses distinguished by the dimensions of υ and of τ. FIGS. 15*a–c* show the collapses where τ is a tetrahedron. υ is the common face of all shaded triangles, which from left to right is a triangle, an edge, a vertex. FIGS. 15*d–e* show the cases where τ is a triangle and υ is an edge on the left and a vertex on the right. FIG. 15*f* shows the only remaining case where τ is an edge and υ is a vertex. In Steps 524, 526, and 528 the collapse removes all faces of τ that are cofaces of υ. A collapse removes simplices at and near the boundary and lays open interior simplices. When these interior simplices becomes part of the boundary they are, at the same time, added to the stack, in Step 530, and are therefore subject to future collapse if all conditions for collapsibility are satisfied.

Figure 16:
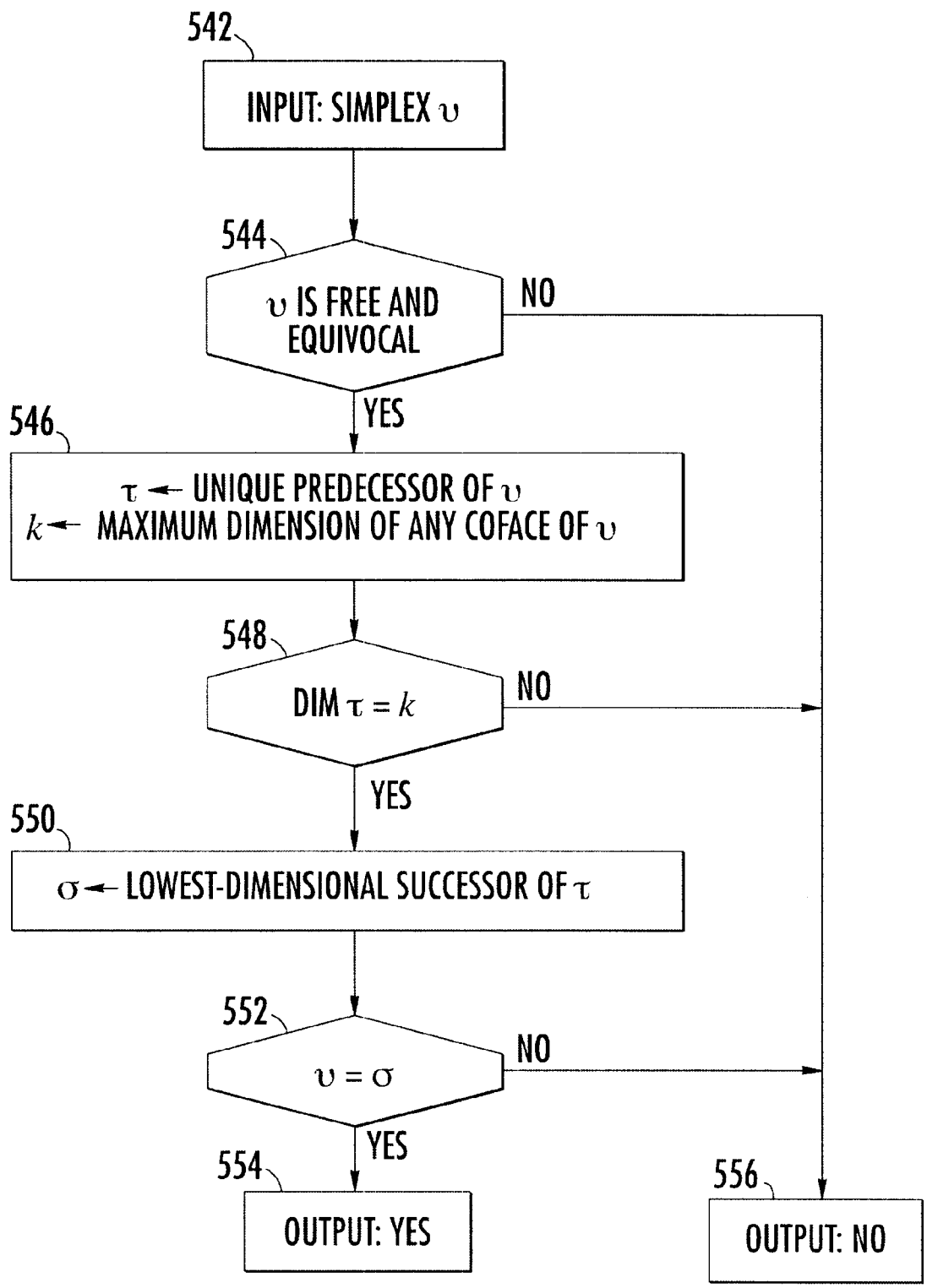
FIG. 16 illustrates the steps to test whether a pair of simplices is collapsible.

Given a pair of simplices $\upsilon \subseteq \tau$, the test whether or not it is collapsible follows the sequence of steps shown in FIG. 16. In Step 542, the simplex υ that specifies the pair is read. The other simplex τ is the unique flow predecessor of υ, in Step 546. The pair is collapsible if υ is free and equivocal, which is tested in Step 544,
τ has maximum dimension among all cofaces of υ, according to Step 546, 548, and
υ is the lowest-dimensional flow successor of τ, according to Steps 550, 552.

Figure 17:
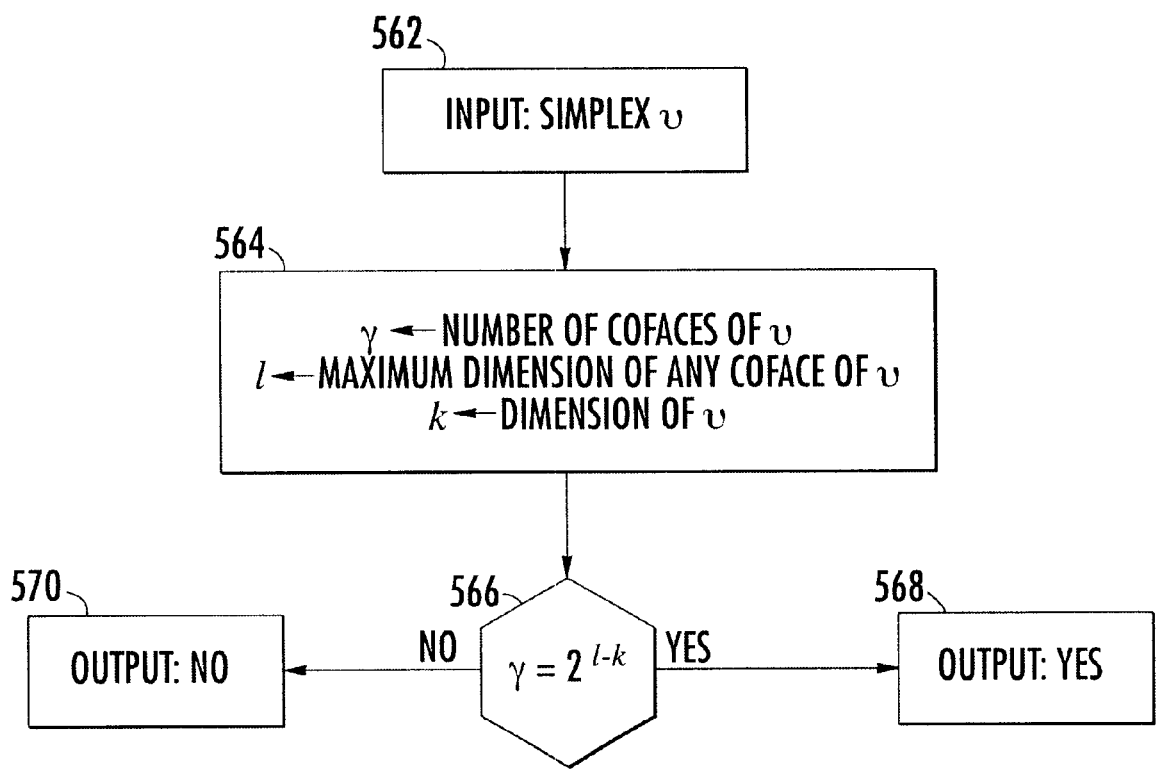
FIG. 17 illustrates the steps to test whether a simplex is free.

If all theses conditions are satisfied then the simplex pair is collapsible as determined in Step 554, otherwise it is not collapsible, as determined in Step 556. A simplex υ is free it if has a unique coface that has all cofaces of υ as faces. The test is elaborated in FIG. 17. First we compute in Step 564 the number of cofaces, γ, the maximum dimension of any such coface, l, and the dimension of υ itself, k. υ is free exactly if γ equals 2 to the power l-k in Steps 566 and 568, and otherwise it is not free, in Step 570.

The retraction process described above produces a shape description that is a reasonable reconstruction under the given measurements. If part of the physical object was poorly measured or if the available measurements leave major ambiguities about the precise geometry then it is possible that the model does not satisfy all user expectations. To cover these cases the representation is provided in a form that permits high-level editing operations changing the model in a user guided process.

Figure 18:
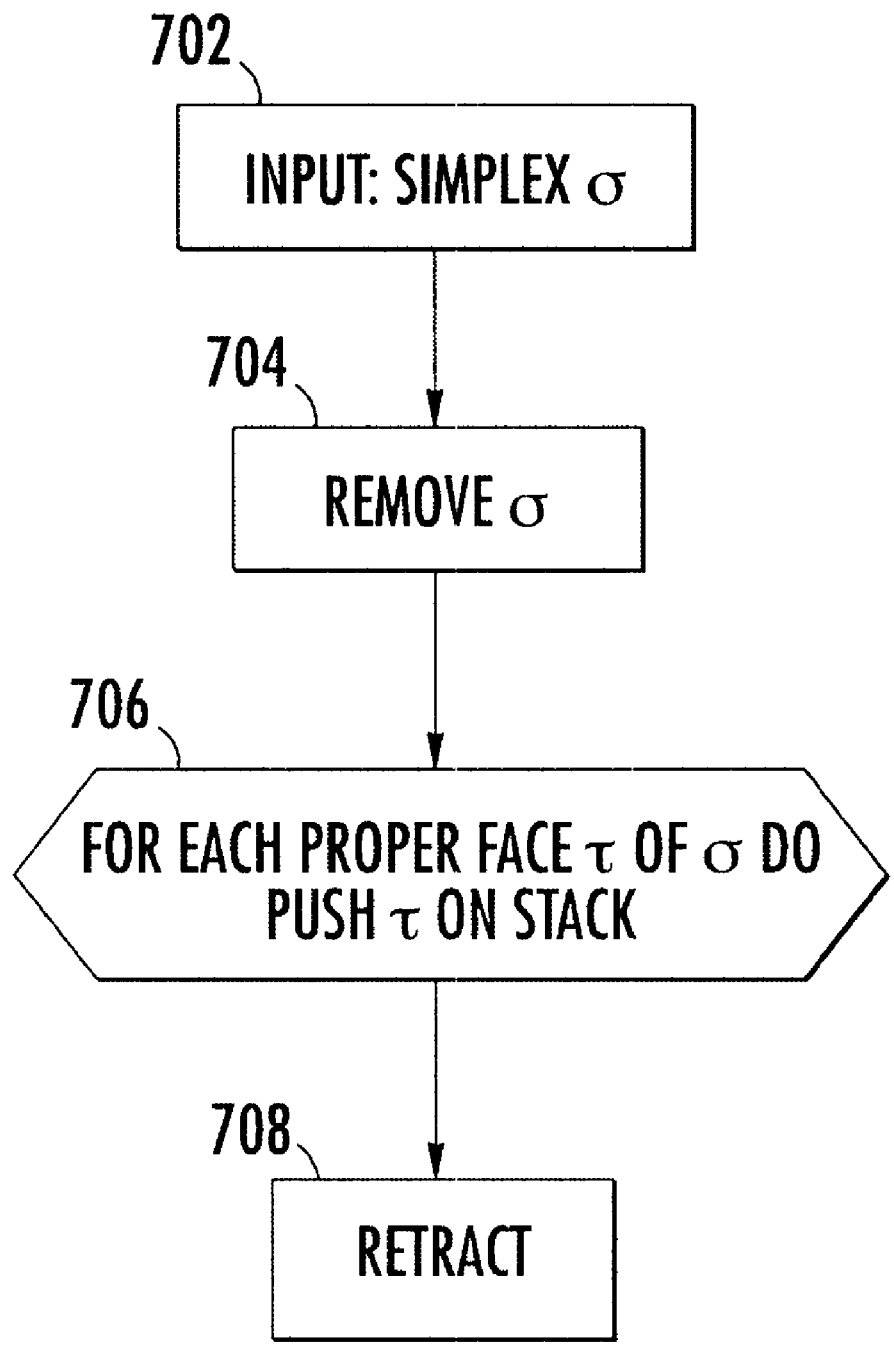
FIG. 18 illustrates the steps of deleting a centered and principal simplex and retracting its boundary.

Besides retracting the only other basic operation needed for editing is deleting. The logical Steps are illustrated in FIG. 18. The deletion applies to simplices σ that are centered and principal, which means that they contain their local flow and they have no proper cofaces in the complex that describes the shape. In Step 704, simplex σ is removed. In Step 706, all simplices in its boundary are put on the stack to prepare a local retraction, as determined in Step 708. The deletion of σ can either be initiated by the user selecting σ and selecting the deletion operation from a menu of possibilities, or it can be the consequence of another operation. For example, the user does in general not know which simplices are centered and which are principal. In the event a non-centered or non-principal simplex τ has been chosen, a minimal set of centered and principal simplices σ is determined whose deletion removes τ. If τ is not centered then the simplices σ are located by following the flow relation down to the sinks. If τ is not principal then the same search locates centered simplices starting from cofaces of τ.

Figure 19:
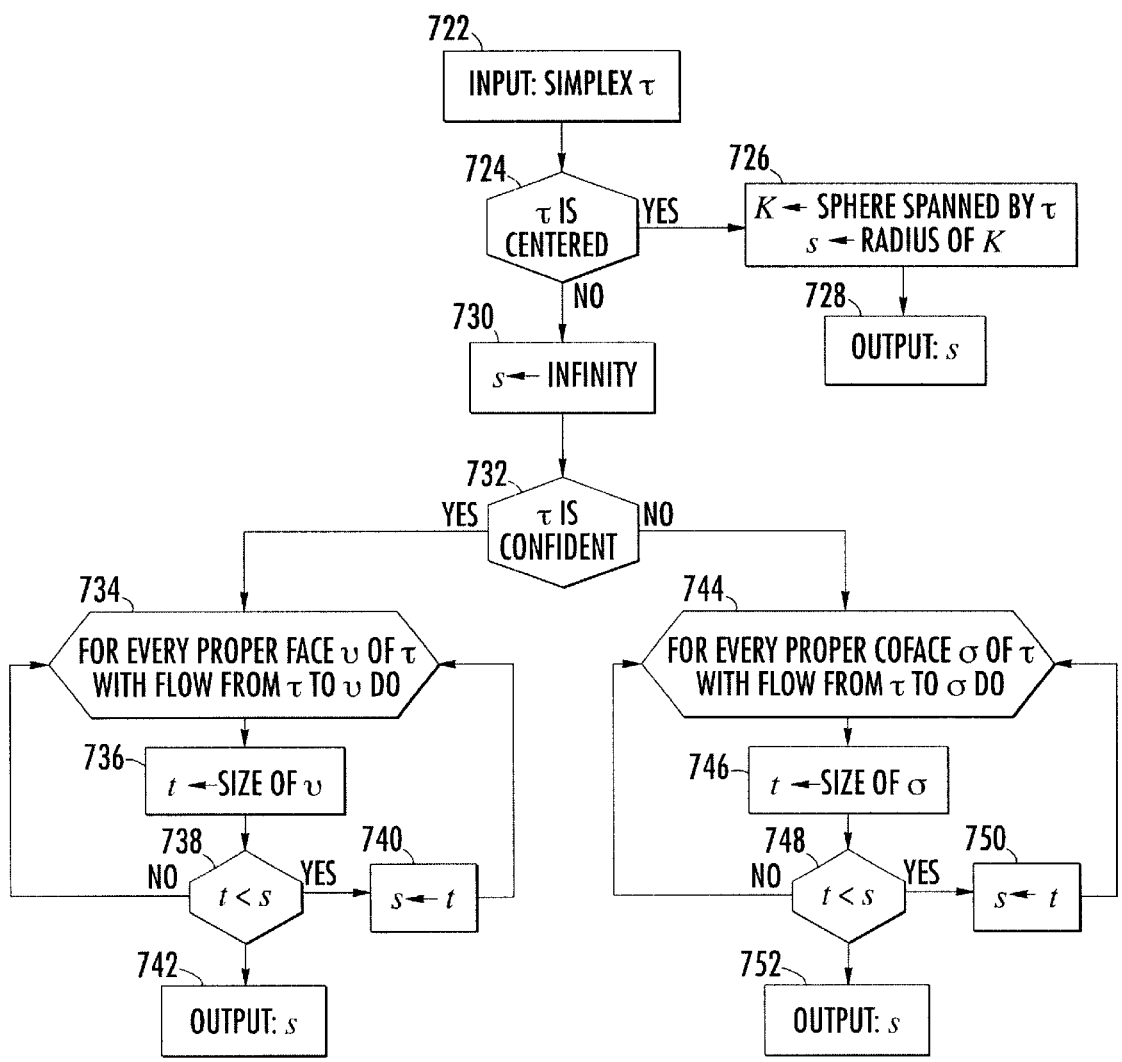
FIG. 19 illustrates the steps of determining the size of a simplex.

Deletions are often used to remove portions of the model that are locally less dense than the surrounding. In this case, deletion operations can be automatically conglomerated by issuing another deletion for every simplex encountered whose size is larger that the simplex chosen by the user. The notion of size appropriate in this context is the radius of the smallest sphere that passes through the vertices of the centered descendent in the flow relation. FIG. 19 illustrates how the size is computed. If the simplex is centered then the size is computed directly from the vertices, in Step 726. Otherwise, the flow relation is searched down to the reachable sinks. These sinks are centered and the size can be computed directly. The search is prepared by setting the current size to infinity, in Step 730. If $\tau$ is confident, as determined in Step 732, the flow is followed by visiting descendent faces, in Step 734, and if $\tau$ is equivocal the flow is followed by visiting descending cofaces, in Step 744. After computing the size of a face or coface, in Steps 736 or 746, the current size is updated if it exceeds the computed size, in Steps 738, 740 or 748, 750. Finally, the current size, which is the smallest size determined in the process, is returned as determined in Steps 742 or 752.

The basic shape reconstruction method described above permits several variations that either extend its field of applications or improve the mode of its application. The basic method reads and processes the entire set of measured points and reconstructs the shape from the entirety of available information. A different mode is the incremental reconstruction where a shape is continually updated while newly measured points are received. The data is a stream or sequence of points, and at some time, $\tau$, an initial portion of this stream has been read and processed into a shape representation as described. To proceed, one or several new points are read and the shape is updated to reflect the additional information. A simple implementation of this mode would discard the earlier shape and rebuild the new shape from scratch for the larger data set. This would, however, be totally impractical as it would increase the time to solution, which currently is a few minutes for moderately large data sets of a few ten thousand points, by a factor almost as large as the number of points. What is needed is an incremental reconstruction process that altogether takes only moderately more time than the one-shot reconstruction for the entire data set.

There are two facts that make such a process possible, and this possibility is unique in all shape reconstruction methods known today. First, the construction of the Delaunay complex is already incremental, as illustrated in FIG. 4. Indeed, at the time the ith point is considered, the Delaunay complex of the first i-1 points is already complete. Second, the wrap process reconstructs a shape that is unique for a given data set. It follows that also the difference between the shape of the first i-1 points and the first i points is unique. This difference can be computed locally by searching the neighborhood of the ith point in the Delaunay complex. The shape can locally grow or shrink or both depending on the relative position of the points. Rather than working solely by retracting, as is done in the basic mode, the shape is updated by first locally growing and then locally retracting it.

As mentioned the incremental reconstruction permits a mode where measuring the physical object and reconstructing the shape as a digital model are interleaved. The user can observe the reconstruction as the object is scanned, and the evolving shape can be used to guide the scanning process. Incremental reconstruction is also useful in a context where the scanning device produces a vast number of measurements indiscriminately and in a short time. This is true for some of the larger laser scanners available from Cyberware and other vendors. The number of points may be larger than possible to store in memory of most modern computers, and because the number of measurements is large most of them are bound to be redundant or of little significance. The solution to this problem suggested by the incremental reconstruction method is to first sample a small subset of the points and to reconstruct the shape for that subset. Second, all other points are considered in turn, and a point that is redundant or whose addition would change the shape only insignificantly is discarded right away, which saves time and memory. Only points that change the shape significantly and thus contribute valuable information are added to the shape representation. In other words, the maintained shape is used as an intelligent filter to determine which of the other points are important and should be used in the shape reconstruction. It is also possible to remove points as they become redundant because of the addition of other points. This way the shape can be improved without increasing the size of the model and the amount of memory that is needed to store it.

The shape reconstruction 300 method as described until now is based solely on the location of measured points, and these can be either on the boundary or in the interior of the physical object. Whenever scanners are used to make measurements, all data points are necessarily on the boundary, which is a piece of extra information that can be exploited in the reconstruction process. Another extra piece of information that is sometimes available is for each measured point the half-line or ray along which it was found. Rather than inventing a new and more specialized reconstruction process, we can make minor modifications to the wrap process to exploit the extra information. In short, we use the extra information to automatically determine deletions that would otherwise have to be issued manually.

Let p be a measured point at the end of a half-line, L. A point x moving along L would hit the object the first time at p. It follows that L does not intersect the object other than at p. We can therefore check for any intersections between L and the reconstructed model, and if any triangles are hit by L they are eliminated by deletions, as illustrated in FIG. 18. Such triangles are detected by walking along L from triangle to triangle in the Delaunay complex; and if one such triangle also belongs to the shape complex then it is deleted before the walk is continued. The extra effort of finding intersections between half-lines and the shape model costs more time than the entire basic wrap process and should therefore be treated as an option the user may or may not use.

The shape reconstructed by the wrap process is a subcomplex of the 3-dimensional Delaunay complex of the data points. In other words, its surface is composed of triangles selected from the Delaunay complex. By the same token we could add the Delaunay simplices in the interior of the model to the shape representation. This amounts to a volume model that decomposes the shape volume into tetrahedra.

Such volume models are also known as tetrahedral meshes or grids and they play an important role in the simulation of physical reactions, such as airflow, heat exchange, and deformation under stress. However, the tetrahedral mesh connecting surface points only is not very useful for the simulation because the tetrahedra will tend to be elongated with poor numerical properties. It will be necessary to add points in the interior and to locally update the mesh without changing the shape. This can be done through finding locations of interior points whose addition improves the form and numerical properties of the tetrahedra. These points can be added in a fully automatic process until the local properties of all tetrahedra are satisfactory.

The basic shape reconstruction method and all above improvements work with measurements that are 3D points. All components generalize to a situation where each point has assigned to it a real number referred to as its weight. The Delaunay complex is generalized to the weighted Delaunay complex by generalizing the sphere conditions that decide which tetrahedra, triangles, and edges belong to the complex. To be specific, each weighted point is equivalent to a sphere whose center is the point and whose radius is the square root of the weight. For any collection, T, of four or fewer such spheres, there are spheres K orthogonal to all spheres in T. In other words, K intersects every sphere in T in a right angle. Algebraically, this means that the distance square between the center of K and the center of a sphere in T is equal to the sum of the two radii squared. The orthogonal spheres assume the role of the spheres passing through the points in the unweighted case. In words, the simplex defined by the centers of the spheres in T belongs to the weighted Delaunay complex exactly if there is an orthogonal sphere that is further than orthogonal from all other weighted points. The definitions of flow and retraction also generalize readily to the case of points with weights, again by substituting orthogonal shperes for spheres that pass through the points.

The case of points without weights is the special case where all weights are the same, for example all weights are 0. The effect of increasing the weight of a point is that it connects to points in a larger neighborhood around it. This shows that not the absolute size of the weights is important but rather the relative size as compared to the weights of nearby points. For example the weight adjustment of interior points can be used to improve the form and numerical properties of tetrahedra without adding new points.

What is claimed is:

1. A method of converting a physical object into a three-dimensional digital model, the method comprising the steps of:
   acquiring data points measured from a surface of the physical object;
   reconstructing a three-dimensional digital model of the physical object from the data points by:
      constructing a Delaunay complex of the data points and a flow structure of simplices in the Delaunay complex; and
      retracting the Delaunay complex into three-dimensional digital model of the physical object using the flow structure; and
   modifying the three-dimensional digital model using a shape improvement method selected from the group consisting of data relaxation by filtering out high surface frequencies, surface refinement by decomposing edges and triangles, surface decimation by reducing a number of edges and triangles and surface thickening.

2. The method according to claim 1 wherein the data points are represented as a list of Cartesian coordinates.

3. The method according to claim 1 wherein the data points are acquired by a three-dimensional scanner, digitizer or other hardware able to measure points in three-dimensional space.

4. The method according to claim 1 wherein the data points are derived from a previously generated three-dimensional digital model.

5. The method according to claim 1 wherein the three-dimensional digital model is used to fabricate or manufacture copies or modifications of the physical object.

6. The method according to claim 1 wherein the three-dimensional digital model is used for computer visualizations, animations, or other uses in computer graphics.

7. The method according to claim 1 wherein the three-dimensional digital model is stored for purposes of archiving or supporting database searches.

8. The method according to claim 1 wherein the three-dimensional digital model comprises a description of a volume of the physical object in terms of tetrahedra connecting the data points.

9. A method of generating a model of an object, comprising the steps of:
   acquiring data points that define a shape of the object; and
   constructing a three-dimensional digital model of the object by:
      determining a Delaunay complex from the data points;
      determining an acyclic flow relation of simplices in the Delaunay complex;
      determining a first boundary of the Delaunay complex; and
      retracting the Delaunay complex by collapsing a first simplex pair in the acyclic flow relation at the first boundary.

10. The method according to claim 9, wherein the acquiring step and the constructing step are interleaved.

11. The method according to claim 10 further comprising the steps of:
   considering additional points to be used in constructing the three-dimensional digital model;
   discarding redundant ones of the additional points; and
   changing the three-dimensional digital model by incorporating at least some of the additional points that contribute valuable information about the object.

12. The method according to claim 9, wherein the constructing step comprises the step of editing the retracted Delaunay complex to remove extraneous surfaces and punch holes in the Delaunay complex that appear as tunnels in the three-dimensional digital model having a non star-shaped surface that outlines a volume.

13. The method of claim 9, wherein the step of collapsing a first simplex pair in the acyclic flow relation at the first boundary defines a second boundary and is followed by the step of collapsing a second simplex pair in the acyclic flow relation at the second boundary.

14. A method of modeling a non star-shaped surface of a physical object, comprising the steps of:
   acquiring data points that describe the non star-shaped surface of the physical object and are identified by their Cartesian coordinates;
   processing the data points using an automated wrap function that, independent of information in excess of the Cartesian coordinates of the data points, converts the data points into a three-dimensional digital model of the non star-shaped surface of the physical object; and
   outputting the three-dimensional digital model of the non star-shaped surface of the physical object.

15. The method according to Claim 14 wherein the processing step is performed by hardware functioning as a three-dimensional faxing machine.

16. The method according to claim 14 wherein the processing step is performed by three-dimensional scanning hardware.

17. The method according to claim 14 wherein the processing step is made automatic by a customized template, wherein the template reflects shared data characteristics acquired from multiple reconstructions.

18. The method according to claim 14 wherein the processing step is performed by software embedded in an inventory system that stores digital models of three-dimensional physical objects in a database and supports the operations of retrieving and matching digital models.

19. The method according to claim 14 wherein the processing step generates a unique three-dimensional digital model of the non star-shaped surface of the physical object.

20. The method according to claim 19 wherein the uniqueness of the three-dimensional digital model is exploited to facilitate the interleaving of the acquiring step and the processing step.

21. The method according to claim 14 wherein the processing step generates digital surface models with manifold structure and with non-manifold structure.

22. The method according to claim 14 wherein the processing step is performed by software operating within a computer.

23. The method according to claim 14 wherein the three-dimensional digital model consists of an impeccable surface without cracks and without self-intersections.

24. A method of generating a model of an object, comprising the steps of:
    acquiring a set of data points that define a shape of the object and carry information regarding respective probing half-lines; and
    constructing a three-dimensional digital model of the object from the set of data points by:
        generating a first three-dimensional digital model having a first boundary;
            checking for intersections between a probing half-line and
        simplices of the first three-dimensional digital model;
            eliminating simplices of the first three-dimensional digital model that intersect the probing half-line to thereby define a second three-dimensional digital model having a second boundary; and
            retracting the second three-dimensional digital model by removing simplices on the second boundary.

25. The method according to claim 24 wherein the constructing step and the acquiring step are interleaved.

26. The method according to claim 25 wherein the constructing step samples a subset of data points within the set of data points and then partially constructs the three-dimensional digital model from the sampled points and then uses the partially constructed three-dimensional model as a filter to determine which ones of remaining data points within the set of data points are to be used in generating a final three-dimensional digital model.

27. A method of generating a model of an object, comprising the steps of:
    constructing a Delaunay complex of points and a flow structure of simplices in the Delaunay complex; and
    retracting the Delaunay complex into a three-dimensional digital model of the object using the flow structure as a guide.

28. A computer program product that models an object and comprises a computer-readable storage medium having computer-readable program code embodied in said medium, said computer-readable program code comprising:
    computer-readable program code means that constructs a Delaunay complex of points and a low structure of simplices in the Delaunay complex; and
    computer-readable program code means that retracts the Delaunay complex into a three-dimensional digital model of the object using the flow structure as a guide.

29. The program product of claim 28, wherein said medium comprises a CD-ROM.

30. A method of modeling a non star-shaped surface of a physical object, comprising the steps of:
    acquiring data points that describe the non star-shaped surface of the physical object and are identified by their Cartesian coordinates; and
    processing the data points using an automated wrap function that, independent of connectivity information linking the data points by edges and triangles, converts the data points into a three-dimensional digital model of the non star-shaped surface of the physical object.

* * * * *

UNITED STATES PATENT AND TRADEMARK OFFICE
CERTIFICATE OF CORRECTION

PATENT NO. : 6,377,865 B1  Page 1 of 1
DATED : April 23, 2002
INVENTOR(S) : Edelsbrunner et al.

It is certified that error appears in the above-identified patent and that said Letters Patent is hereby corrected as shown below:

Column 18,
Line 19, please change "low" to -- flow --.

Signed and Sealed this

Twenty-third Day of July, 2002

Attest:

Attesting Officer

JAMES E. ROGAN
Director of the United States Patent and Trademark Office